(12) United States Patent
Shroff et al.

(10) Patent No.: US 7,921,167 B2
(45) Date of Patent: Apr. 5, 2011

(54) VIRTUAL ELECTRONIC CARD BASED NETWORKING

(76) Inventors: Kaushal Shroff, Lawrenceville, NJ (US); Keyur Shroff, Piscataway, NJ (US)

( * ) Notice: Subject to any disclaimer, the term of this patent is extended or adjusted under 35 U.S.C. 154(b) by 428 days.

(21) Appl. No.: 12/004,702

(22) Filed: Dec. 21, 2007

(65) Prior Publication Data
US 2009/0164589 A1    Jun. 25, 2009

(51) Int. Cl.
*G06F 15/16*    (2006.01)
(52) U.S. Cl. .............. 709/206; 379/144.01; 379/142.01; 705/26; 705/319; 705/39; 705/1.1
(58) Field of Classification Search .................. 709/206
See application file for complete search history.

(56) References Cited

U.S. PATENT DOCUMENTS

| | | | |
|---|---|---|---|
| 5,732,229 A * | 3/1998 | Dickinson ...................... 715/764 |
| 5,852,807 A * | 12/1998 | Skarbo et al. ...................... 705/7 |
| 2003/0211856 A1* | 11/2003 | Zilliacus ........................ 455/466 |
| 2004/0042599 A1* | 3/2004 | Zaner et al. ................ 379/144.01 |
| 2004/0158485 A1* | 8/2004 | Lawerman ......................... 705/8 |
| 2005/0004865 A1* | 1/2005 | Chudnovsky et al. .......... 705/39 |
| 2005/0102297 A1* | 5/2005 | Lloyd et al. .................... 707/100 |
| 2005/0182644 A1* | 8/2005 | Douvikas et al. ................. 705/1 |
| 2005/0216300 A1* | 9/2005 | Appelman et al. ................ 705/1 |
| 2006/0168544 A1* | 7/2006 | Zaner et al. .................... 715/836 |
| 2006/0195781 A1* | 8/2006 | Jatavallabha et al. .......... 715/506 |
| 2008/0052203 A1* | 2/2008 | Beyer et al. ..................... 705/28 |
| 2009/0072025 A1* | 3/2009 | Daigle et al. .................. 235/380 |
| 2009/0076928 A1* | 3/2009 | Hjertonsson et al. ........... 705/26 |
| 2009/0088215 A1* | 4/2009 | Caspi et al. ................... 455/563 |
| 2009/0089055 A1* | 4/2009 | Caspi et al. ................... 704/235 |
| 2009/0089580 A1* | 4/2009 | Sugikawa ..................... 713/168 |
| 2009/0187549 A1* | 7/2009 | Samn ............................... 707/4 |

OTHER PUBLICATIONS

RFC 2426 Lotus Development Corporation T. Howes, Netscape Communications Sep. 1998.*

* cited by examiner

*Primary Examiner* — Dohm Chankong
*Assistant Examiner* — Tauqir Hussain
(74) *Attorney, Agent, or Firm* — Ash Tankha; IP Legal Services

(57) ABSTRACT

The computer implemented method and system disclosed herein enables online networking based on exchange of virtual electronic cards between a plurality of users. An online networking environment is provided to a user. The user creates a personal profile in the online networking environment. Further, the user may create a company profile or link with an existing company profile. A virtual electronic card of the user is automatically created in the online networking environment. The virtual electronic card is one of a personal electronic card and a company electronic card. A personal contact network of the user is established in the online networking environment by exchanging personal electronic cards between the user and the plurality of users. Further, a company contact network of the company of the user is established by exchanging company electronic cards between the company of the user and a plurality of companies.

20 Claims, 26 Drawing Sheets

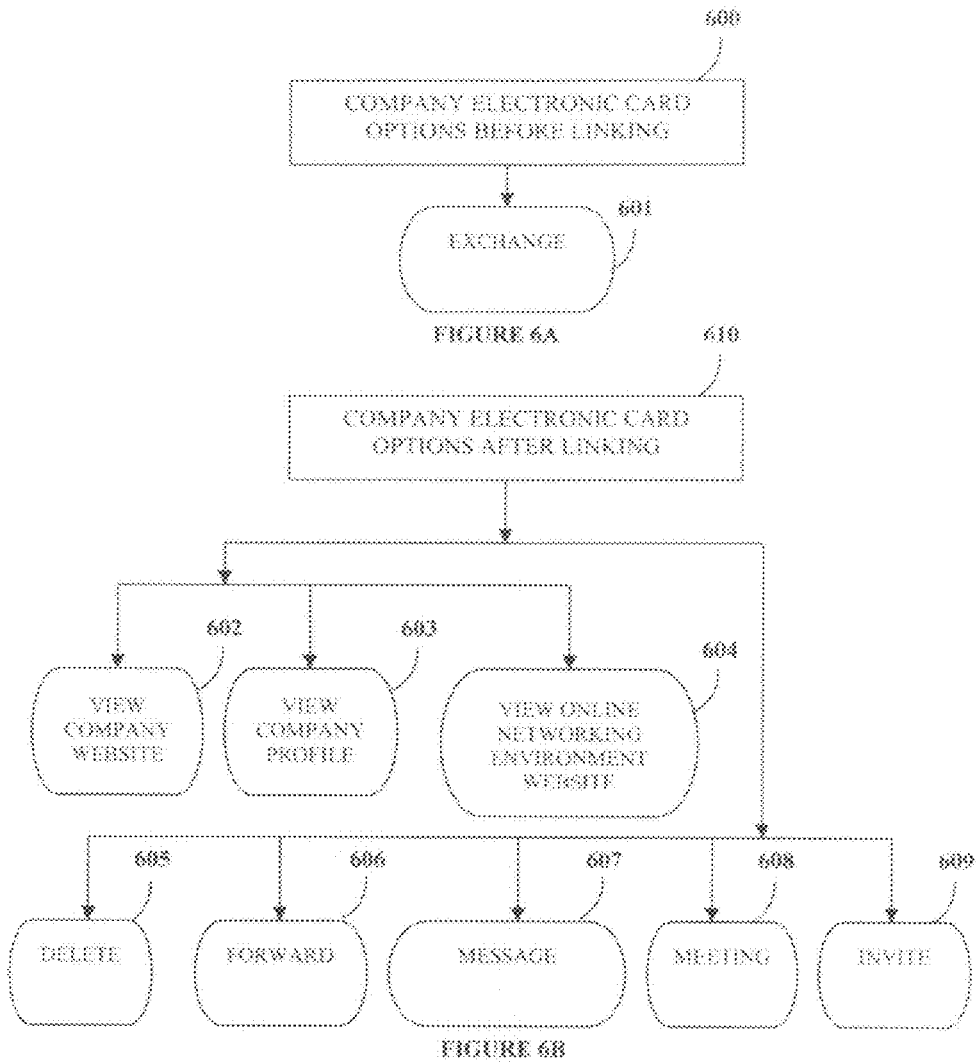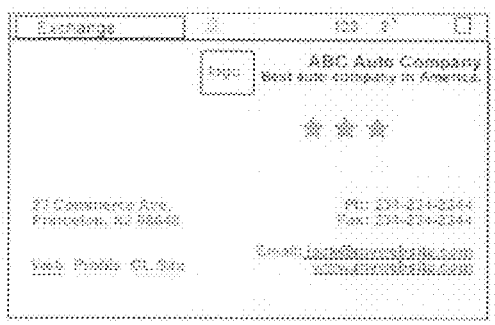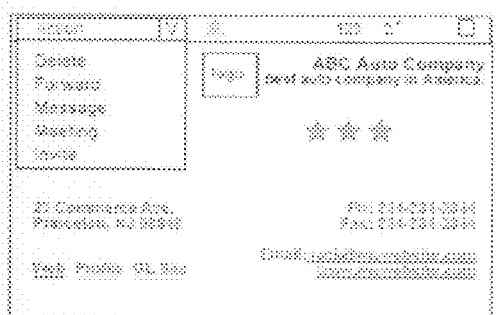

*First Name                                         *Last Name

*Business Email                                     Other Email

*Business Phone Number                              *Business Fax Number

List Your Skills And Qualifications. (400 characters)
Your profile will be searched and viewed by others.

400 characters are remaining

*Password (6-10 characters)                         *Confirm Password (6-10 characters)

*Job Title                                          *Job Category

*Are you currently a student? ○ Yes ○ No

Which college did you attend?
United States          ▼   please select a state  ▼

* Are you currently employed? ○ Yes ○ No

Which company are you employed at?
United States          ▼   please select a state  ▼   Select a company...  ▼

*Verify Your Registration
                  7V884

* ☐ I agree with Terms and Conditions

Submit

FIGURE 7

Create Company

*Company Name  *Branch/Headquaters  *Country
[          ]   [          ▼]       [United States ▼]

Company Slogan (max 25 chars)
[               ]

*Address 1      Address 2
[         ]     [         ]

*State/Province  County          *City         *Zip Code
[        ▼]      [       ▼]      [         ]   [         ]

*Website Address  *Company Email Address  *Company Phone  *Company Fax
[          ]      [          ]            [         ]     [         ]

Products and Services
[         ]

[Add] Click here to add more products and services.

Company Description (350 Characters)
[                    ]

☐Manufacturer  ☐Distributor  ☐Wholesaler  ☐Services  ☐Retail

Company Logo [         ] [Browse]

*Industry
[        ▼]

Industry Buy From
[        ▼]

Industry Sell To
[        ▼]

*No. of Employees   Annual Sales     Year Established
[        ▼]         [       ▼]       [         ]  [Submit]

FIGURE 8

| Home | Office | Network | Company | Leads | Jobs | Events | Groups | Advice |

MY OFFICE

| Keyword | Network ▼ |

Office

Virtual office with online business tools and free online storage

Inbox (25)

David Seldom — Online Care

No Image

David Seldom
Doctor david@abc.com
www.china.com

David Seldom
Care
  Doctor
  Health Care
  Lhasa
  Tibet China (mainland)

Edit Card
○ Appear Online
○ Appear Offline

- Edit Profile
- Edit Privacy Settings
- Edit Testimonials
- View My Activities

Jobs Leads Advice Groups Events

Events
Thu, Dec 20 02:05 AM Test 4
Fri, Dec 14 02:05 AM Test 2   Wed, Dec 26 03:00 AM Car

---

My Network   View all(3)   Edit Network(3)

■ Action ▼  2  1  □
Robert Booker
Care
  Drug Specialist
  Health Care
  Lhasa
  Tibet China (mainland)

■ Action ▼  1  1  □
Lizy Desouza
Relax Cigars
  Distributor
  Manufacturing
  Houston
  Texas ■ Action ▼  1  1  □
Tony Booker
CAR
  Rep
  IT - Networking
  Sydney
  Australia

Viewed My Profile   View all(3)

■ Action ▼  2  1  □
Mic Berman
Solutions
  Programmer
  IT - Software
  Hyderabad
  Andhra Pradesh India ■ Action ▼  1  1  □
Tony Booker
CAR
  Rep
  IT - Networking
  Sydney
  New South Wales Australia ■ Action ▼  1  1  □
Tony Booker
Care
  Drug Specialist
  Health Care
  Lhasa
  Tibet China (mainland)

Briefcase   (Edit)

1
Electronic Card 2
png

Name   Document

Skills or Qualifications Edit

Recent Experience Edit

Testimonials (1) Edit

FIGURE 13

| Home | Office | Network | Company | Leads | Jobs | Events | Groups | Advice | |
|---|---|---|---|---|---|---|---|---|---|
| NETWORK | SEARCH | | | | | | | Keyword | Network |

Network
Exchange business ecards and form a professional network.

Network

| Individual | Companies | | | Small Card ▼ | Sort By | Page [ ] Go |
|---|---|---|---|---|---|---|

| Network | Your Linkers | Online Now | Companies | 2nd Degree | 3rd Degree |
|---|---|---|---|---|---|
| Current Network | 3 | 3 | 3 | 4 | 7 |

Select Multiple Cards ▼ Message ▲ Forward ✗ Delete

▼Action ▼ 🔲 2 1 🔲
Robert Booker
Care
Drug Specialist
Health Care
Lhasa
Tibet China (mainland)

▼Action ▼ 🔲 1 1 🔲
Lizy Desouza
Relax Cigars
Distributor
Manufacturing
Houston
Texas ▼Action ▼ 🔲 1 1 🔲
Tony Booker
CAR
Rep
IT - Networking
Sydney
Australia

| Small Card ▼ | Sort By | Page [ ] Go | <1> |
|---|---|---|---|

FIGURE 14

Home  Office  Network  Company  Leads  Jobs  Events  Groups  Advice

PROFILE | PORTFOLIO | TESTIMONIALS | HIERARCHY | SEARCH   Keyword  Network

Company
Create free company profile and appear on our list of global companies.

Company Card

Exchange   123  2 logo  ABC Auto Company
      Best Auto Company
      in America
      ☆ ☆ ☆

Logo

Branch: New York, NY, USA
Employees: 500-1000
Industry: Health Care
Buys From: Accounting
Sells To: Real Estate Web  Profile  GL Site

Representative

David Seldome
ABC Company
  Doctor
  Health Care
  Lhasa
  Arizona USA

GL Site URL: GlobalLinker/e2.php
Change GL Site
Annual Sales: Under $1M
Est: 2002
United States
Edit Company Profile  Edit GL
                              Site Viewed By: 33

Ph: 234-234-2344
Fax: 234-234-2344
Email: jack@mywebsite.com
       www.mywebsite.com Branch Name ▼

Assigned By: David Seldome   Link to Parent or Branch Company
  Charge Representative David Seldome ▼ | GL Site | Website | Portfolio

Background   Edit Company Background Information

Products/Services
* Oil change
* Auto testing
* Tire Services
* Engine Tune up ABC Auto Company is a New York based company. We have been in business for over 30 years and appreciate your business.

Company Events

17:18 PM Nov.30.2007
Company Event

Last Edited By

David Seldome
ABC Company
  Doctor
  Health Care
  Lhasa
  Arizona USA

Briefcase      Edit Briefcase

Care

Card   FD   bmp
       Report   Image

| Home | Office | Network | Company | Leads | Jobs | Events | Groups | Advice |
|---|---|---|---|---|---|---|---|---|

BUY | SELL | SEARCH

Groups
Business and Professional Groups

Keyword | Network

Group Details

Healthy China Group

👥 3   Public

📍 Beijing, China

[Join]   [Invite]

Group By:

☑ Action ⌄  👤 0  ✉ 1
Mary Colvig
Constructions
   Rep
   Construction
   Beijing, China China's largest health group welcomes you. Join to discuss various health related topics with members around the world.

👥 3 Members Signed up

☑ Action ⌄  👤 2  ✉ 1
David Seldome
Care
   Doctor
   Health Care
   Lhasa
   Arizona, USA ☑ Action ⌄  👤 2  ✉ 1
Lizy Desouza
Relax Cigars
   Distributor
   Manufacturing
   Houston
   Texas, USA ☑ Action ⌄  👤 0  ✉ 1
Mary Colvig
Constructions
   Rep
   Construction
   Beijing, China

FIGURE 19B

| Home | Office | Network | Company | Leads | Jobs | Events | Groups | Advice |
|---|---|---|---|---|---|---|---|---|
| ADVISE | POST | SEARCH | | | | Keyword | Network ▼ | ▼ |

Advise
Professional and small business advise and articles.

| Industry | Question | Starter | Advise | Views | Latest |
|---|---|---|---|---|---|
| Health Care | Science | Robert Booker | 3 | 6 | David Seldome |
| Health Care | Transport | Robert Booker | 1 | 1 | David Seldome |

Health Care Events    Health Care ▼

| Accounting | Call Center | Education | Health Care | IT – Software | Manufacturing | Real Estate | Transportation |
|---|---|---|---|---|---|---|---|
| Administrative | Catalog | Entertainment / Art | Hotel / Travel | IT – Web Design | Media | Restaurant | Utilities |
| Advertising | Construction | Financial | IT – Graphic Design | Legal | Non Profit | Retail | Wholesale |
| Auto | Consulting | Government | IT – Networking | Logistics | Other | Telecommunications | |

Keyword [        ]   Industry [ All ▼ ]   Category [ All ▼ ]   Posted [    ]   Page [  Go  ] [ Search ]

| Industry | Content | Last Posted | Last Reply | Advise | <1> Views |
|---|---|---|---|---|---|
| Health Care | Science<br>I have a biology question. | Nov.22.2007 | Nov.27.2007 | 3 | 6 |
| Health Care | Transport<br>Transportation in North America is limited by. | Dec.09.2007 | Dec.09.2007 | 1 | 1 |

FIGURE 20A

VIRTUAL ELECTRONIC CARD BASED NETWORKING

BACKGROUND

This invention generally relates to business networking. More particularly, this invention relates to online networking based on exchange of virtual electronic cards.

Typically, traditional business cards are used for establishing a business network between one or more of individuals and companies. Storing, managing, and modifying the traditional business cards is cumbersome and costly. Moreover, exchanging traditional business cards with individuals and companies residing in distant geographical locations may not be viable. The individuals and companies residing in distant geographical locations need to exchange business cards for networking. Further, the individuals and companies may want to update or customize the business cards for enhancing the aesthetic appearance of the business cards. The individuals and companies may also want to promote businesses, perform business consulting, share information, and perform business transactions with individuals and companies around the globe based on level of confidence. Most importantly, exchanging business cards, gaining global exposure, and competing in the global market is a necessity in today's world.

Hence, there is an unmet need for online networking based on the exchange of virtual electronic cards to form a business network.

SUMMARY OF THE INVENTION

The computer implemented method and system disclosed herein addresses the above stated need for online networking based on exchange of virtual electronic cards between multiple users or multiple companies.

The method and system disclosed herein provides an online networking environment. Registration in the online networking environment includes creating a personal profile by the user for creating a virtual electronic card. If the user is employed, the user is provided with an option to search for existing company profile or to create a new company profile. The user may also create the company profile at a later period of time. On finding a company profile based on the search, the user can associate with the company as an employee of the company. If the company does not exist in the search results, the user can create a company profile of the company of the user. If the user is unemployed or does not wish to create the company profile, the user has the option to create only the personal profile without creating a company profile. Further, based on the information entered by the user, virtual electronic cards are automatically created. The virtual electronic cards created may be at least one of a personal electronic card and a company electronic card. The method and system disclosed herein establishes a personal contact network of the user in the online networking environment by exchanging personal electronic cards between the user and one or more of a plurality of users. Further, a company contact network of the company of the user is established when a company's employee exchanges company electronic cards with one or more of a plurality of companies.

The user is provided with options to perform the step of exchanging, deleting, forwarding, messaging, inviting, and participating in online meetings with one or more users in the online networking environment using the personal electronic card. Further, the user is provided with options to perform the steps of exchanging, deleting, forwarding, messaging, inviting, and participating in online meetings in the online networking environment using the company electronic card. The online networking environment allows the user to invite one or more of the plurality of users and companies to one or more of the plurality of online meetings, advice section, events, groups, jobs, and leads associated with the user. The user may edit and format the virtual electronic card by one or more steps of selecting background, formatting text, uploading a logo image, and editing styles, shapes, and information of the virtual electronic card. The company electronic card of the company may display ratings the company has received from other users. In short, the personal electronic card displays personal information and company electronic card displays company information. The user exchanges the virtual electronic cards with one or more of the plurality of users and forms a global business network in the online networking environment.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein. Further the word linking in the document means connecting or associating.

FIGS. 6A-6D exemplarily illustrate the available options on a company electronic card.

FIG. 7 exemplarily illustrates a user registration form for registering a user, creating a personal profile of the user, and creating a virtual electronic card of the user in the online networking environment.

FIG. 8 exemplarily illustrates a company registration form for registering a company, creating a company profile, and creating a virtual electronic card of the company by the user in the online networking environment.

FIG. 13 exemplarily illustrates the personal profile 'office' webpage of the online networking environment.

FIG. 14 exemplarily illustrates the 'network' webpage of the online networking environment.

FIG. 15 exemplarily illustrates the 'company profile' webpage of the online networking environment.

FIGS. 16A-16B exemplarily illustrate the webpage of the 'leads' section in the online networking environment.

FIGS. 17A-17B exemplarily illustrate the webpage of the 'jobs' section in the online networking environment.

FIGS. 19A-19B exemplarily illustrate the webpage of the 'groups' section in the online networking environment.

FIGS. 20A-20B exemplarily illustrate the webpage of the 'advice' section in the online networking environment.

DETAILED DESCRIPTION OF THE INVENTION

Figure 1:
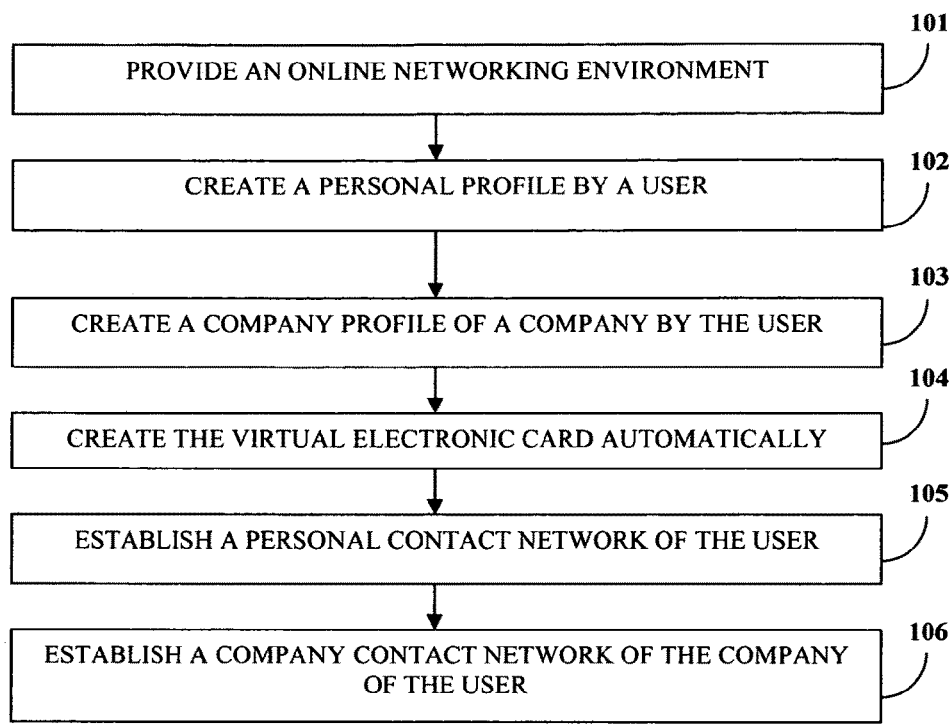
FIG. 1 illustrates a computer implemented method of online networking based on creation of user and company profiles and exchange of virtual electronic cards between users or companies.

FIG. 1 illustrates a computer implemented method of online networking based on creation of profiles and exchange of virtual electronic cards between users 210 or companies. The method disclosed herein provides 101 an online networking environment. The online networking environment is used for exchanging the virtual electronic cards between multiple users 210. The exchange of the virtual electronic cards allows a user to form a global business network in the online networking environment. Exemplarily, consider a user, Adam belonging to a company XYZ in America, joins the online networking environment. Adam wants to create a business network to gain exposure and compete in the global economy. The exchange of traditional business cards with professionals in far off countries, for example, China and India may not be viable for Adam. Henceforth, by utilizing the online networking environment, the global business network may be formed by Adam by exchanging virtual electronic cards with other users 210 of the online networking environment. The online networking environment comprises a combination of a home webpage, a personal profile webpage, a business network webpage, a company profile webpage, a company testimonial webpage, a company organizational chart webpage, a company website created in the online networking environment, a leads webpage, a jobs webpage, events webpage, groups webpage, an advice webpage, and an online chat meeting webpage. The description of each of the webpage's in the online networking environment is explained in the detailed description of FIGS. 12-20B.

Figure 9:
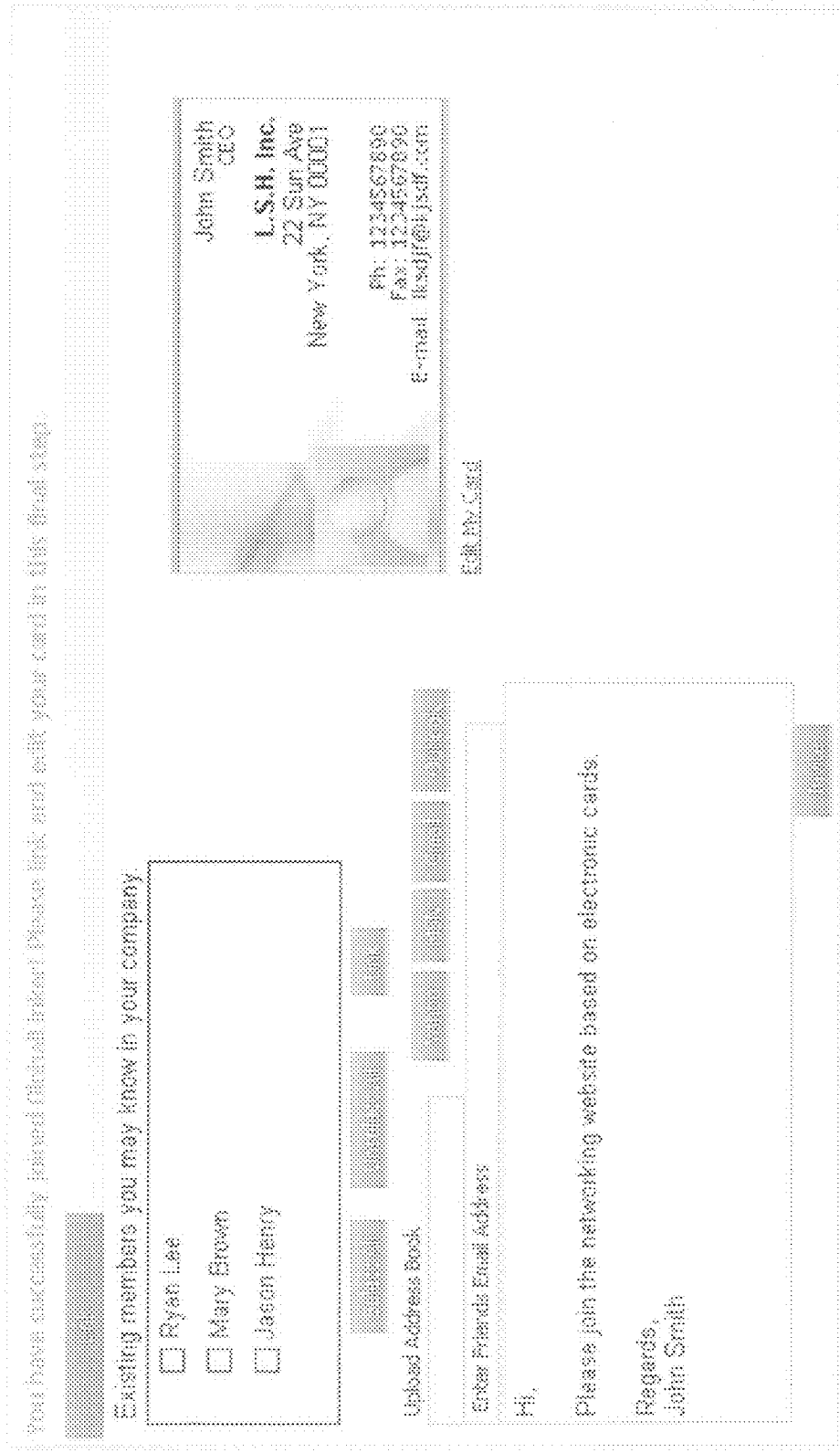
FIG. 9 exemplarily illustrates a step of linking the user with employees belonging to the same company as the user in the online networking environment.

The user creates 102 a personal profile in the online networking environment for creating the virtual electronic card. The personal profile is created upon registration of the user in the online networking environment. The step of registration of the user includes providing user information including combination of first name, a last name, an electronic main (email) address, a phone number, a fax number, skills and qualifications, a password, a registration verification code, etc, on a user registration form. The user registration form is exemplarily illustrated in FIG. 7. A company search section provided in the user registration form enables the user to search for an existing company profile of the company of the user in the online networking environment. On finding the existing company based on the search result, the user associates with the existing company as one of an employee or an owner of the company. The virtual electronic card of the user is further linked with virtual electronic cards of the employees of the existing company once the user sends the invitation and upon the approval of the employees. The step of linking the user with employees belonging to the same company as the user in the online networking environment is exemplarily illustrated in FIG. 9. Further, the user may invite non members by email to register in the online networking environment and automatically link with the user.

The user creates 103 a company profile upon not finding the company of the user in the search result. The company profile is created upon the registration of the company of the user in the online networking environment. The user has the option to create the company profile at a later period of time. Furthermore, the user has the option to create only the personal profile without creating a company profile if the user is unemployed or does not wish to create the company profile. The step of registration of the company by the user includes providing company information by the user including combination of a company name, a company address, a company slogan, company description, number of employees, company logo, industries the company buys from, industries the company sells to, year established, annual sales, products and services, etc., on a company registration form. The company registration form is exemplarily illustrated in FIG. 8.

The method disclosed herein creates 104 the virtual electronic card automatically. The virtual electronic card may be the personal electronic card or the company electronic card. The personal electronic card is automatically created in the online networking environment upon creation of the personal profile. The company electronic card is automatically created in the online networking environment upon creation of the company profile. The personal electronic card and the company electronic card include information from the created personal profile and the company profile. The virtual electronic card is displayed in the online networking environment. The personal profile of the user comprises user information and the personal electronic card. The company profile comprises company information and the company electronic card. The plurality of users 210 view the personal profile by clicking the personal electronic card and further view the company profile by clicking the company electronic card. The method disclosed herein establishes 105 a personal contact network of the user in the online networking environment by exchanging personal electronic cards between the user and the plurality of users 210.

Further, a company contact network of the company of the user is established 106 by exchanging company electronic cards between a first company and one or more of the plurality of companies. The exchange is initiated by the user associated with the first company. The step of establishing the company contact network between a first company and a second company comprises exchanging company electronic cards by the first company with the second company upon approval from the representative of the second company. The exchanged company electronic card may be viewed by all the employees within the company. Further, any employee of the company registered with the online networking environment may perform actions like delete the company electronic card, set online meetings, forward the company electronic card, invite users, and send messages in the online networking environment. The aforementioned actions may require approval from the company representative.

The personal electronic card comprises an option for the user to perform the step of exchanging 501 for linking with one or more of the users. Further upon linking 507, the personal electronic card includes a list with options for the user to perform the steps of deleting 502, forwarding 503, messaging 504, chat meeting 505, and inviting 506. The available options on the personal electronic card are explained in the detailed description of FIGS. 5A-5D. The option for exchanging allows the user to exchange the personal electronic cards with one or more of the plurality of users 210. The exchange of the personal electronic cards comprises automatically sending invitation messages to the users 210 to join the personal contact network of the user. The invitation message may display options to accept or deny the personal electronic card. The exchange feature allows users to exchange their personal electronic cards and form a personal contact network if the other user selects the accept option.

The option for deleting allows the user to delete the existing personal electronic card of one or more of the plurality of users from the existing personal contact network. Further, if a first user deletes a personal electronic card of a second user from the personal contact network, the first user's personal electronic card will also be deleted from second user's personal contact network. Upon deletion of the personal electronic card of the user, an electronic mail message is sent to the other user. The option for forwarding allows the user to forward the personal electronic card of one or more of the users 210 of the personal contact network to one or more users 210 in the personal contact network and one or more companies in the company contact network.

The option for messaging allows the user to send messages to one or more of the plurality of users 210 of the personal contact network. The messages on the online network are received in the user's inbox in the online networking environment. The option for meeting allows the user to invite one or more of the plurality of users to an online chat meeting at a specified time. Upon approval of the other user, all participating users view a chat window at the specified time. The chat window is exemplarily illustrated in FIG. 21. The option for inviting allows the user to invite one or more of the plurality of users 210 of the personal contact network to one or more of the plurality of online meetings, advice section, events, groups, jobs, and leads associated with the user. The leads section, jobs section, events section, groups section, advice section, company section, organizational chart, company network, personal network, online meeting, company profile, and personal profile appear in the online networking environment. Furthermore, the leads section, jobs section, events section, groups section, advice section, company section, organizational chart, company network, personal network, online meeting, company profile, and personal profile of the user display at least one of the personal electronic cards and the company electronic cards. The user and the company are identified using the relevant personal electronic cards and company electronic cards in each of the aforementioned sections.

The company electronic card comprises an option for the user to perform the step of exchanging 601 for linking with one or more of the companies. The user may view one or more of company website address link 602, company profile link 603, and online networking environment website link 604 on the company electronic card. Further upon linking 610, the company electronic card includes a list with options for the user to perform the steps of deleting 605, forwarding 606, messaging 607, meeting 608, and inviting 609. The available options on the company electronic card are explained in the detailed description of FIGS. 6A-6D. The option for exchanging allows the user to exchange company electronic cards with one or more of the plurality of companies. The step of exchanging company electronic cards comprises automatically sending invitation messages to company representatives of the other companies to approve and thus join the company contact network.

The invitation message may display options to accept or deny. Upon accepting the company electronic card by the company representative, the company electronic card may be viewed by all employees belonging to the company contact network. The option for deleting allows the employee of the company or the representative to delete one or more of the company electronic cards from the company contact network. Upon deletion of a company electronic card of a company, an email message is sent to that company or the representative of that company. The option for forwarding allows the user to forward the company electronic card of one or more of the plurality of companies in the company contact network to one or more of the companies in the company contact network and one or more users 210 in the personal contact network. The option for messaging allows the user to send messages to one of the plurality of companies in the company contact network. The option for inviting allows the user to invite the company representatives of one or more of the plurality companies to one or more online meetings, advice, events, groups, jobs, and leads associated with the user. The employees or the representative belonging to a company may also perform the steps of exchanging, deleting, forwarding, messaging, meeting, and inviting.

The personal electronic card may be one of an image and a multimedia card comprising user information. The company electronic card may be one of an image and a multimedia card comprising company information. The virtual electronic cards may be of different fonts, sizes, shapes, colors and may have logos, background image, and textual information. Further, the virtual electronic card of a larger size may be displayed by scrolling over a smaller sized virtual electronic card. The personal virtual electronic cards comprise information on number of common linkers and degrees of separation. Common linkers refer to other users who are in the personal contact network of the user. The degrees of separation indicate the smallest number of contacts the card owner is away from the other user. The number of common linkers and the degrees of separation are displayed on the virtual electronic cards.

The personal electronic cards may display one or more of a name of the user, a photograph of the user, logo of the company, indicator to show online presence of the user, company name, email address, contact information, degrees of separation between the user and the plurality of users 210, number of common linkers that are of a predefined number of degrees away from the user in the personal contact network, company website address, an action drop down menu, and a checkbox. The company electronic cards may display one or more of a company name, number of common registered employees who are a predefined number of degrees away from the user, number of degrees away another company is from the company of the user, company logo, company rating, contact information, email address, company website address, the online availability of a representative, company profile link, link to the website created on the networking environment, an action drop down menu, or a check box. The company electronic card of a company may display ratings the company has received from the users 210.

The user may edit and format the virtual electronic card by one or more steps of selecting background, formatting text, uploading logo image, and editing styles, shapes, and information of the virtual electronic card. The user may also upload an image and multimedia of a scanned business card. Further, the scanned business card may be used as the virtual electronic card by the user. The user may customize the virtual electronic card during or after registration. The edited virtual electronic card and associated information of the users 210 are stored on an electronic device. The electronic device may be one of a personal computer, mobile phone, a personal digital assistant (PDA), or other electronic devices. The company profile includes company information and company electronic card. An organizational chart includes multiple personal electronic cards of employees of the company in a predefined order. The predefined order may be similar to the hierarchy in the company. The virtual electronic cards can be searched based on one or more of keywords, companies, industry, location, and title.

The user saves the virtual electronic card locally on a computing device from the online briefcase. For example, the user may save the virtual electronic card on a computer, a mobile phone or any other computing device. The user may also exchange the virtual electronic cards saved on the computing devices. The exchange of virtual electronic cards may occur outside the online networking environment. The user may send the virtual electronic card to one or more of the plurality of existing users 210 and non users of the online networking environment via an email. The step of inviting the existing users 210 of the online networking environment comprises sending the email invitation to an online account of the existing users 210 in the online networking environment and permitting the existing users 210 to exchange the virtual electronic cards with the user. The step of inviting the non users comprises sending the email invitation to an email account of the non users and inviting the non users to join the online networking environment and exchange the virtual electronic cards with the user. The online networking environment may be accessed from a web browser, a personal digital assistant, or other electronic devices.

Figure 2:
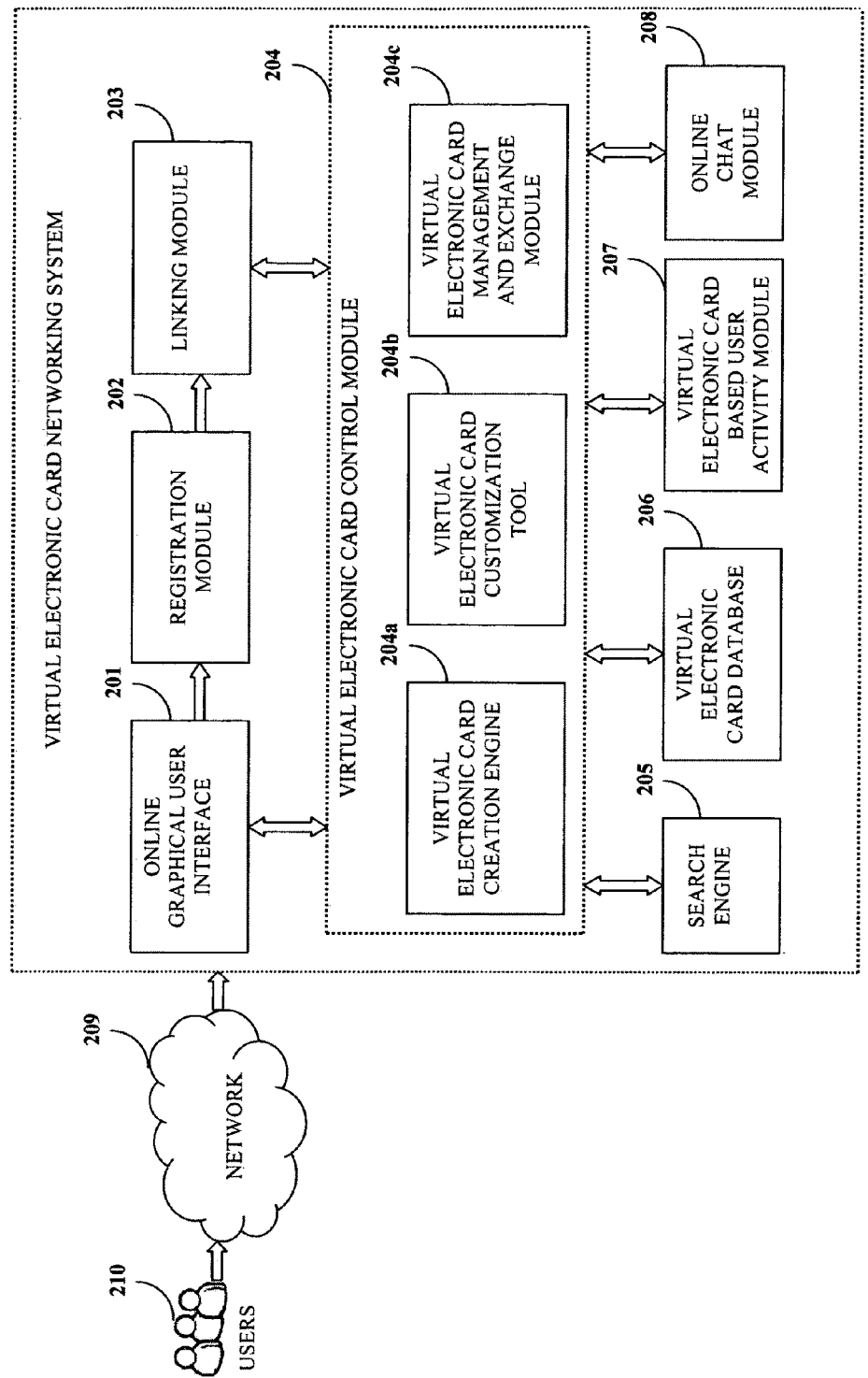
FIG. 2 illustrates a computer implemented system for online networking based on creation of user and company profiles and exchange of virtual electronic cards between users or companies.

FIG. 2 illustrates a computer implemented system for online networking based on creation of profiles and exchange of virtual electronic cards between plurality of users 210 or plurality of companies. The computer implemented system disclosed herein comprises an online graphical user interface 201, a registration module 202, a linking module 203, a virtual electronic card control module 204, a search engine 205, a virtual electronic card database 206, a virtual electronic card based user activity module 207, and an online chat module 208. The virtual electronic card control module 204 further comprises a virtual electronic card creation engine 204a, a virtual electronic card customization tool 204b, and a virtual electronic card management and exchange module 204c.

The online graphical user interface 201 enables a user to create a personal profile and a company profile in an online networking environment. The users 210 may access the online networking environment from one or more of a web browser, a personal digital assistant, and other electronic devices via a network 209. The registration module 202 is used for registering the user and a company in the online networking environment. The personal profile of the user comprises user information and a personal electronic card. Further, the personal profile is created upon the registration of the user in the online networking environment. The company profile comprises company information and a company electronic card. Further, the company profile is created upon the registration of the company of the user in the online networking environment. The linking module 203 links the user to an existing company. The linking module 203 may also enable the user to link with one or more of the plurality of employees within the same company upon the approval of the employees.

The virtual electronic card control module 204 is used for administering processes associated with the virtual electronic card. The virtual electronic card creation engine 204a is used for creating the virtual electronic card automatically. The technical processes involved in the automatic creation of the virtual electronic card are explained in the detailed description of FIG. 3. The virtual electronic card customization tool 204b is used for editing and formatting information and style of the virtual electronic card by the user. The user may edit and format the virtual electronic card by one or more steps of selecting a background, formatting text, uploading a logo image, and editing styles, shapes, and information of the virtual electronic card utilizing the virtual electronic card customization tool 204b.

The virtual electronic card management and exchange module 204c is used for exchanging the personal electronic card between the user and the plurality of users 210. The exchange of the company electronic card with one of the companies and a plurality of companies is performed utilizing the virtual electronic card management and exchange module 204c. The virtual electronic card based user activity module 207 is used for one or more of deleting the virtual electronic card, setting online meetings, forwarding the virtual electronic card, inviting the plurality of users, and sending messages in the online networking environment. Further, the virtual electronic card based user activity module 207 manages the ratings the company has received from the users 210. The ratings are displayed on the company electronic card of a company. The virtual electronic card based user activity module 207 also manages the common linkers and number of users 210 that are certain degrees away.

Events may be created in the online networking environment using the virtual electronic card based user activity module 207. The virtual electronic card based user activity module 207 is further used for posting one of messages, jobs, resume, events, groups, leads, advice question, and advice answers by the users 210. The search engine 205 performs search, based on one or more of keywords, companies, location, industry, and title. The virtual electronic card database 206 saves and stores personal electronic cards and company electronic cards and the data related to the virtual electronic cards. The online chat module 208 enables online chat meetings between the users 210 in the online networking environment.

Figure 3:
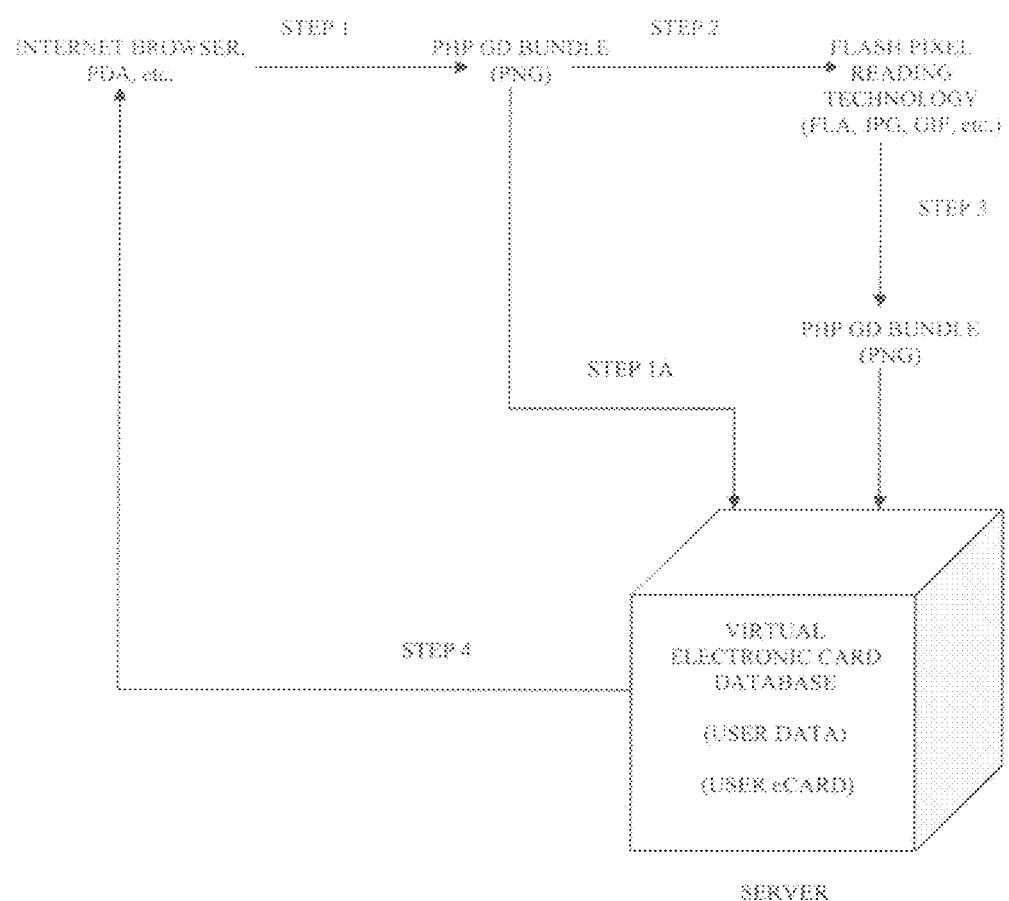
FIG. 3 illustrates technical processes involved in the creation and storage of the virtual electronic card.

FIG. 3 illustrates technical processes involved in the creation and storage of a virtual electronic card. The 'STEP 1' of the process involves automatically generating the virtual electronic cards from the user information obtained during registration in the online networking environment. The virtual electronic cards may be generated using the graphics draw (GD) bundle option of PHP: Hypertext Preprocessor (PHP) programming language. PHP is a Hypertext Markup Language (HTML)-embedded scripting language. The PHP language allows web developers to program and create dynamic web pages. The GD bundle is an extension to PHP and is used for image manipulation in PHP. Images may be created and resized using the GD bundle. The GD bundle may also be used to create and manipulate image files in a variety of different image formats, for example, "Graphics Interchange Format (gif) format, Portable Network Graphics (png) format, Joint Photographic Experts Group (jpeg) format, Wireless Bit Map (wbmp) format, X Pix Map (xpm) format, etc". Using the options provided in the GD bundle, the scripts resizes images like company logo and generates the virtual electronic cards using true type fonts. The fonts are included in PHP using the GD bundle options. The generated virtual electronic card may be saved from PHP to the server as in 'STEP 1A'.

The 'STEP 2' of the process involves customizing the virtual electronic cards. The virtual electronic cards may be customized by the user using a Flash application provided in the online networking environment. The Flash application collects and sends image data and text data modified by the user to the PHP. The customized virtual electronic cards may be in a file format such as "jpeg". The 'STEP 3' of the process involves converting "jpeg" images back to "png" file format using the Flash application. The "jpeg" images are converted using a pixel reading technology of the Flash application. The converted image of "png" format is sent to PHP and saved in a directory. The users 210 may use the Flash application to change the fonts, style, information, shape, and sizes of the virtual electronic cards. The virtual electronic cards may also be customized using an asynchronous JavaScript, xml (AJAX) application or any other technologies.

The users 210 may also draw the graphics and change the color fills using the Flash application's dynamic object creation technology. The Flash application will keep changing the objects and the object's properties. For example object properties can be changed, like color used to fill in the object. If user selects 50% as opacity than it will be transparent to the extent of 50% and other objects below it will be visible. The user can also change line color, line transparency, shape color, shape transparency, opacity etc. These objects can be used in designing the virtual electronic card. The objects will be stored internally inside the flash application and will not be written to the virtual electronic card database 206. The virtual electronic card may be stored directly as "png" format in the virtual electronic card database 206 as in 'STEP 1A' or may be stored in the virtual electronic card database 206 after editing as in 'STEP 3'. The name of the virtual electronic cards stored is unique and is generated using the logged in user's identity and a random string. The 'STEP 4' of the process involves sending the output image streams by the PHP directly to the internet browser, a Personal Digital Assistant (PDA) or any other electronic device.

Figure 4:
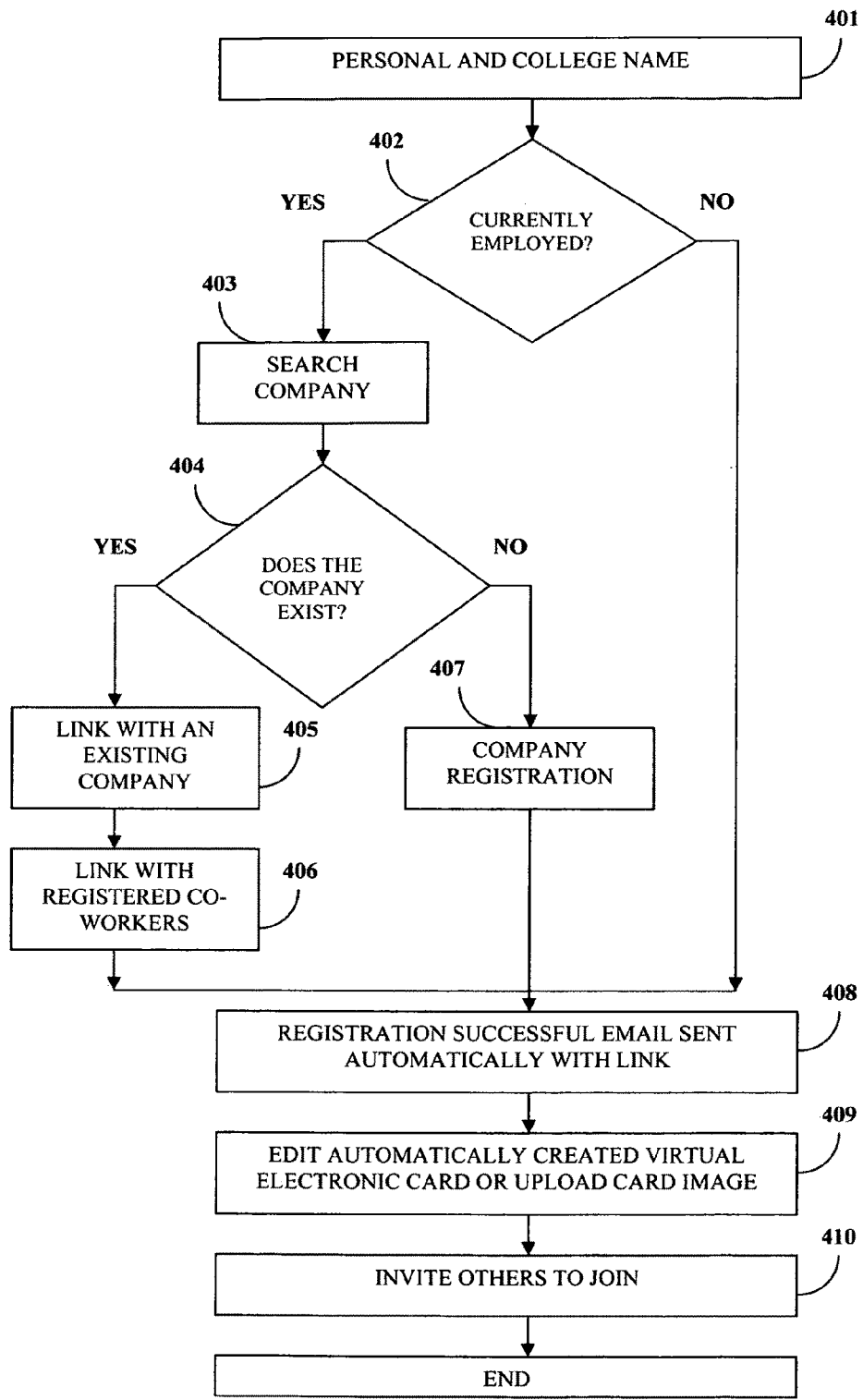
FIG. 4 exemplarily illustrates a flow chart of the steps involved in creation of the virtual electronic cards for the users and companies.

FIG. 4 exemplarily illustrates a flow chart of the steps involved in creation of the profiles and the virtual electronic cards for the plurality of users 210 and the plurality of companies. The user provides user information for registration by providing combination of personal and college name 401, an email address, a phone number, a fax number, skills and qualifications, a password, a registration verification code, etc., to join the online networking environment as displayed in FIG. 7. If the user is currently employed 402, the user searches 403 for an existing company the user is employed with. If the user is currently unemployed 402 or does not want to enter company information, the user completes the user registration and a registration successful email is sent 408 to the user along with the online networking environment link.

If the search 403 results provide 404 an existing company, the user is linked 405 with the existing company and then linked 406 with the registered co-workers if the user chooses and upon approval from the registered co-workers. Further the registration successful email is sent 408 to the user. If the search 403 results do not provide 404 with any information on the company associated with the user, the user registers 407 the company in the online networking environment as displayed in FIG. 8. Further the registration successful email is sent 408 to the user. The company information may be entered during or after the registration process by the user or before the registration process by another user. Virtual electronic card is automatically created and the user is given the option to edit 409 the card or upload the card image. Further, the user may invite 410 other users 210 to join the online networking environment.

Figure 5A:
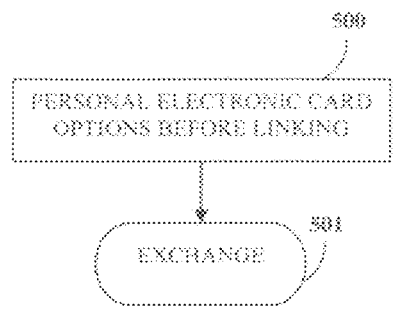
FIGS. 5A-5D exemplarily illustrate the available options on a personal electronic card.
Figure 5B:
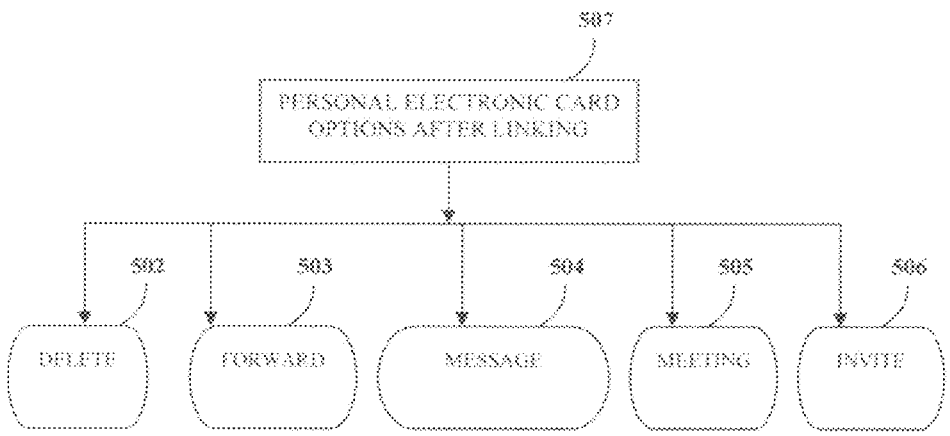
Figure 5C:
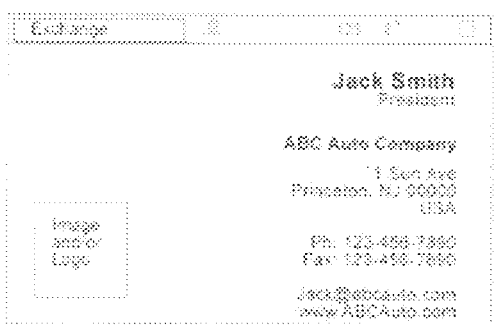
Figure 5D:

FIGS. 5A-5D exemplarily illustrates the available options on a personal electronic card. The personal electronic card comprises an option for the user to perform an exchange 501 of the personal electronic card before the personal electronic card appears 500 in the personal contact network as illustrated in FIG. 5A. Further upon linking 507, the actions drop down menu of the personal electronic card may comprise options for deleting 502, forwarding 503, messaging 504, meeting 505, and inviting 506 as illustrated in FIG. 5B. The personal electronic card may include one or more of personal contact information, photo image, company logo, website address, email address, and number of links the user is away from another user, number of common linkers, checkbox, actions drop down menu and online status icon. The available options in the personal electronic card for a user not in the personal contact network appears as illustrated in FIG. 5C. The available options in a personal electronic card after the exchange are illustrated as in FIG. 5D.

FIGS. 6A-6D exemplarily illustrates the available options on a company electronic card. The company electronic card comprises an option for the user to perform an exchange 601 of the company electronic cards before the company electronic card appears in the company contact network 600 with one or more of the plurality of companies as illustrated in FIG. 6A. Further upon linking 610, the actions drop down menu of the company electronic card may comprise options for deleting 605, forwarding 606, messaging 607, meeting 608, and inviting 609 as illustrated in FIG. 6B. All users 210 belonging to the same company can view the same company contact network. The user may view one or more of company website address link 602, company profile link 603, and online networking environment website link 604 on the company electronic card. The company electronic card may also include one or more of company contact information, company logo, company rating along with number of common linkers with the user, number of degrees, checkbox, and icon indicating the online availability of a representative. The available options in a company electronic card for a user not in the company contact network appears as illustrated in FIG. 6C. The available options in a company electronic card after the exchange are illustrated as in FIG. 6D.

Figure 10:
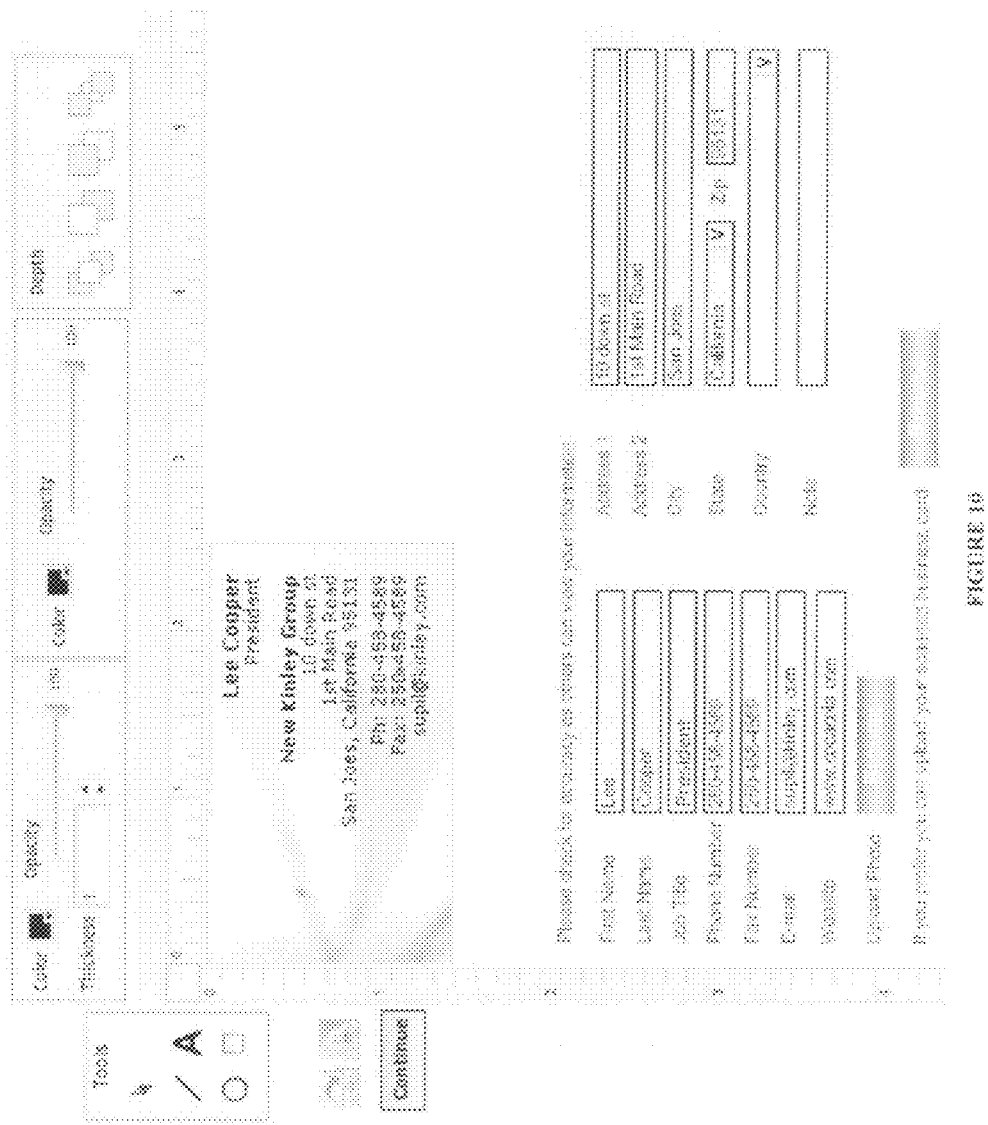
FIG. 10 exemplarily illustrates a virtual electronic card customization tool.

FIG. 10 exemplarily illustrates a virtual electronic card customization tool 204*b*. The virtual electronic card customization tool 204*b* is used for editing and modifying the virtual electronic cards. The virtual electronic cards may be edited and modified at the time of creation of the virtual electronic card or at a later instance of time. The step of editing and modifying the virtual electronic cards comprises editing one or more of color, font, size, shapes, textual information, logo, and background image of the virtual electronic card. The user further has the option to upload a scanned business card using the virtual electronic card customization tool 204*b*. The scanned business card may be used as the personal electronic card by the user in the online networking environment. Thus a scanned card can be exchanged 501 and then have options for deleting 502, forwarding 503, messaging 504, meeting 505, and inviting 506

Figure 12:
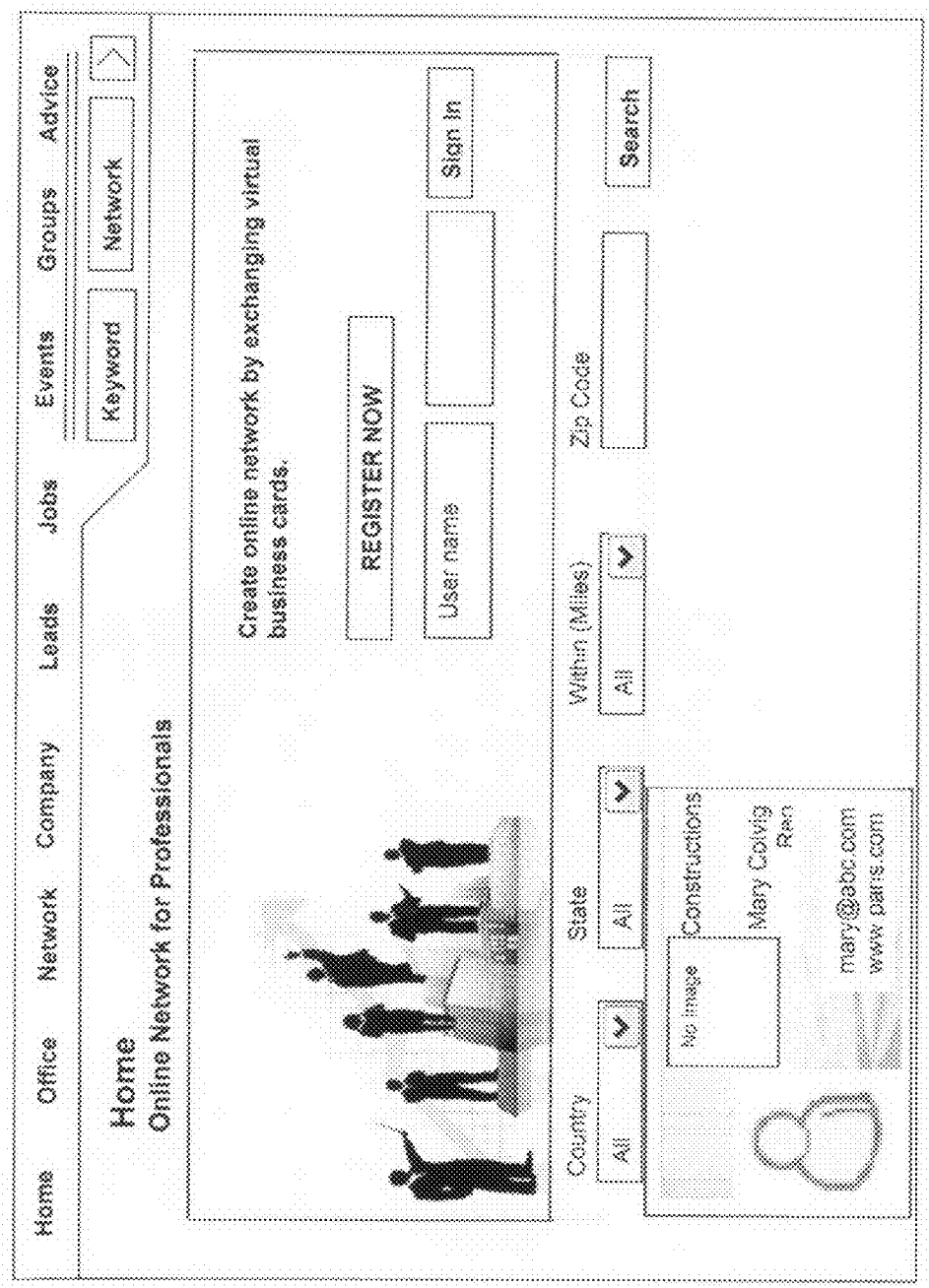
FIG. 12 exemplarily illustrates the 'home' webpage of the online networking environment.

FIG. 12 exemplarily illustrates the 'home' webpage of the online networking environment. The 'home' webpage includes a link for joining the online networking environment. Further, the 'home' webpage of the online networking environment may comprise a search section to perform search based on one or more of name of the user, country, location, college, and keyword. The virtual electronic cards of new users 210 that have networked with most number of members during the first month of joining may also be displayed on the 'home' web page. Further virtual electronic card of advertisers can be displayed on 'home' web page or any other webpage on the virtual networking environment. The 'Search' results in the 'home' webpage will display relevant content along with virtual electronic card to identify professional or company in the online networking environment.

FIG. 13 exemplarily illustrates the personal profile 'office' webpage of the online networking environment. The personal profile 'office' webpage comprises the personal electronic card of the user. A larger virtual electronic card appears next to the smaller virtual electronic card in the personal profile 'office' webpage. The user has the option to appear as online or offline to other users 210. Further, the personal profile 'office' webpage displays the link to the inbox of the user. The user has options to edit the personal profile, the personal electronic card, the company profile, the privacy settings, the testimonials, network, the online briefcase, skills and qualifications and previous experience. The testimonials display the virtual electronic card of the user that provided the testimonial. The skills and qualifications section display the virtual electronic card of the supervisor. The scheduled events may be displayed on the personal profile 'office' webpage of the online networking environment.

The personal profile 'office' of the user viewing the page displays user's virtual electronic card along with the user's profile and includes number of users 210 that are one degree, two degrees, and three degrees away from the user. Further, a "My Network" section on the office webpage will display some of the members of the personal contact network of the user, giving user the option to click on a link to view all the members. A "Viewed My Profile" section displays the members who have viewed the personal profile of the user. The user may view the personal profile of the users 210 of the personal contact network by clicking on the personal electronic card of the users 210. The personal profile 'office' webpage comprises an online briefcase for uploading and displaying one or more of images, text files, audio files, and video files. Other members can view the online briefcase and may download files.

Further, the personal profile 'office' webpage may display and provide edit option to the user for displaying one of skills, qualifications, recent experience, supervisor name, company name, start date of the employment, end date of employment, job title, and other job details. The testimonials for the user also may be displayed on the personal profile 'office' webpage along with the card of user that posted the testimonial. The personal profile 'office' webpage also displays links to the events, groups, jobs, leads, and advice posted by the user. When a first user clicks the virtual electronic card of a second user, a similar 'office' webpage is displayed with fewer items to the first user. The first user will not have access to links for editing the second user's personal profile, the virtual electronic card, the privacy settings, etc.

FIG. 14 exemplarily illustrates the 'network' webpage of the online networking environment. The 'network' webpage displays the personal contact network and the company contact network of the user. The personal contact network comprises personal electronic cards. The company contact network comprises company electronic cards. The personal electronic cards and the company electronic cards may be viewed and sorted as one of a larger sized virtual electronic card and a smaller sized virtual electronic card. Further, the virtual electronic cards may be sorted based on companies, name of the user, online users, number of degrees the user is away, industry, most linked user, or the newest user. The user may further select one of multiple personal electronic cards and company electronic cards of the members and may perform one or more steps of messaging, forwarding, and deleting the virtual electronic cards. The 'network' webpage also provides a search section for the user. Further, online members from the user's network, members who are one degree away, two degrees away, and three degrees away, or information on the number of members belonging to different companies are also displayed in the 'network' webpage. Upon clicking on the links for '$1^{st}$ degree', '$2^{nd}$ degree' and '$3^{rd}$ degree', the user can view the virtual electronic cards of all the users in the category.

FIG. 15 exemplarily illustrates the 'company profile' webpage of the online networking environment. The company section comprises one or more of a company profile section, a portfolio section, a testimonials section, a hierarchy section, and a search section. The company profile webpage of the 'company profile' section displays the personal electronic card of the company representative and a company electronic card of the company. The company electronic card of the company may display ratings the company has received from the users 210. The information about the company such as addresses of the company, number of employees, industry type, industries the company buys from, industries the company sells to, company branch, company website address, background information etc., are displayed on the company profile section. The company representative may also perform one or more steps of creating and editing the company website, editing the company profile, searching for the company branch, editing and maintaining an online briefcase, and giving permissions to employees for various activities. The company website is created by the company representative using preexisting templates and images provided by the online networking environment and adding their own content. The company employee may edit the information about the company and further the personal electronic card of the employee will be displayed next to the edited information in order to identify the employee who edited the information last.

Figure 11:
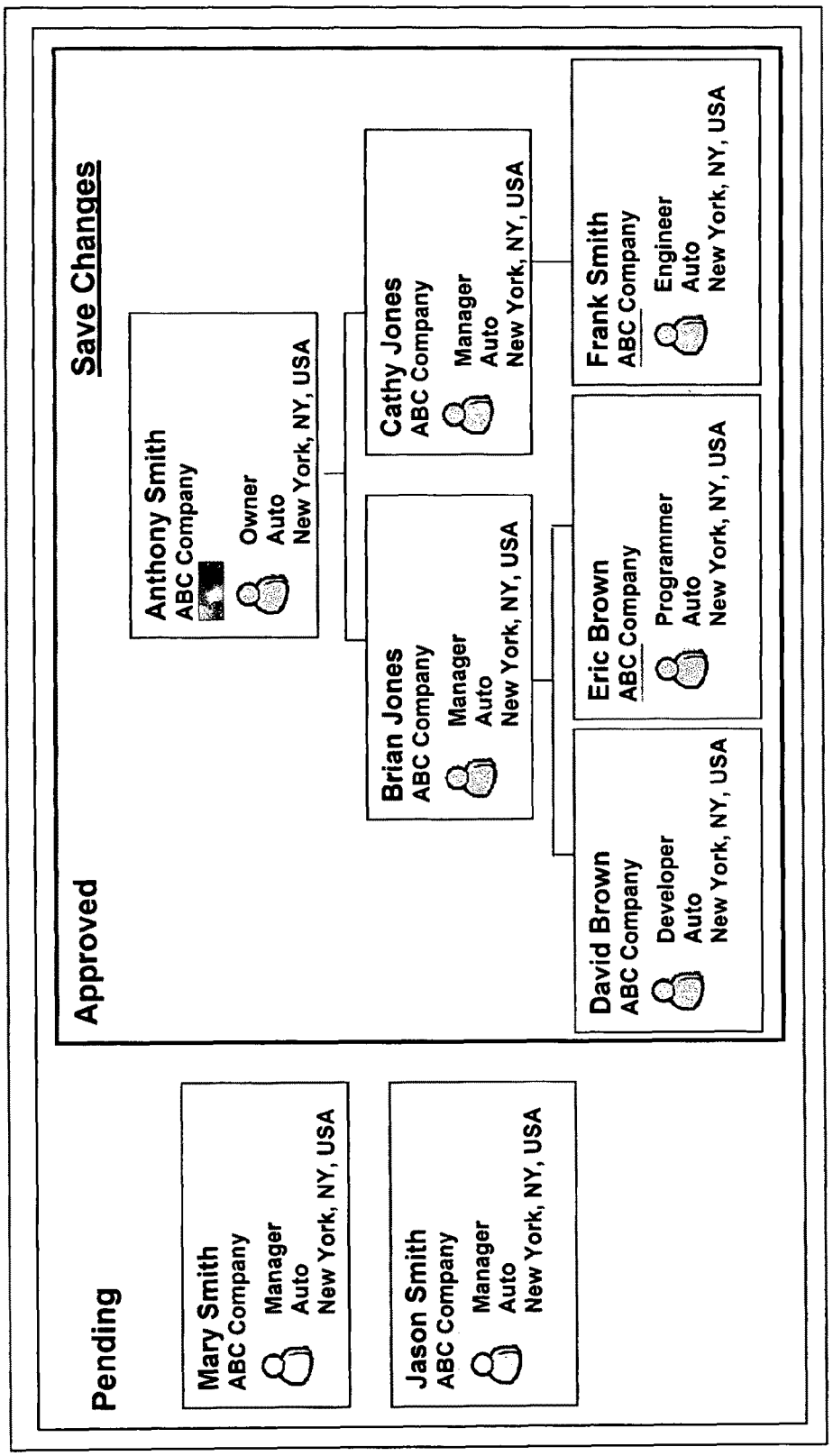
FIG. 11 exemplarily illustrates an organizational chart of the company created with virtual electronic cards.

The portfolio section displays the products and services for the company along with description. Users 210 can rate and write testimonials for each product or service and the user's virtual electronic card will appear next to each product or service testimonials. The users 210 may write testimonials and rate companies on the testimonial webpage of the company section where the user's card appears next to the testimonial. The company section comprises a hierarchy webpage for organizing the virtual business cards in any order or hierarchically. An organizational chart of the company hierarchy using the virtual business card is displayed in the hierarchy webpage of company section. The virtual business cards are further connected by lines in the hierarchy section. The organizational chart is maintained by the employees of the company. The organizational chart is exemplarily illustrated in FIG. 11. Upon receiving approval a dashed line connecting two virtual electronic cards in the hierarchy section turns into solid line. There is 'pending' section where all the unconnected virtual electronic cards appear. The company webpage comprises the search section for performing search based on one or more of keyword, name of the company, industry, number of employees, and location.

Figure 16A:
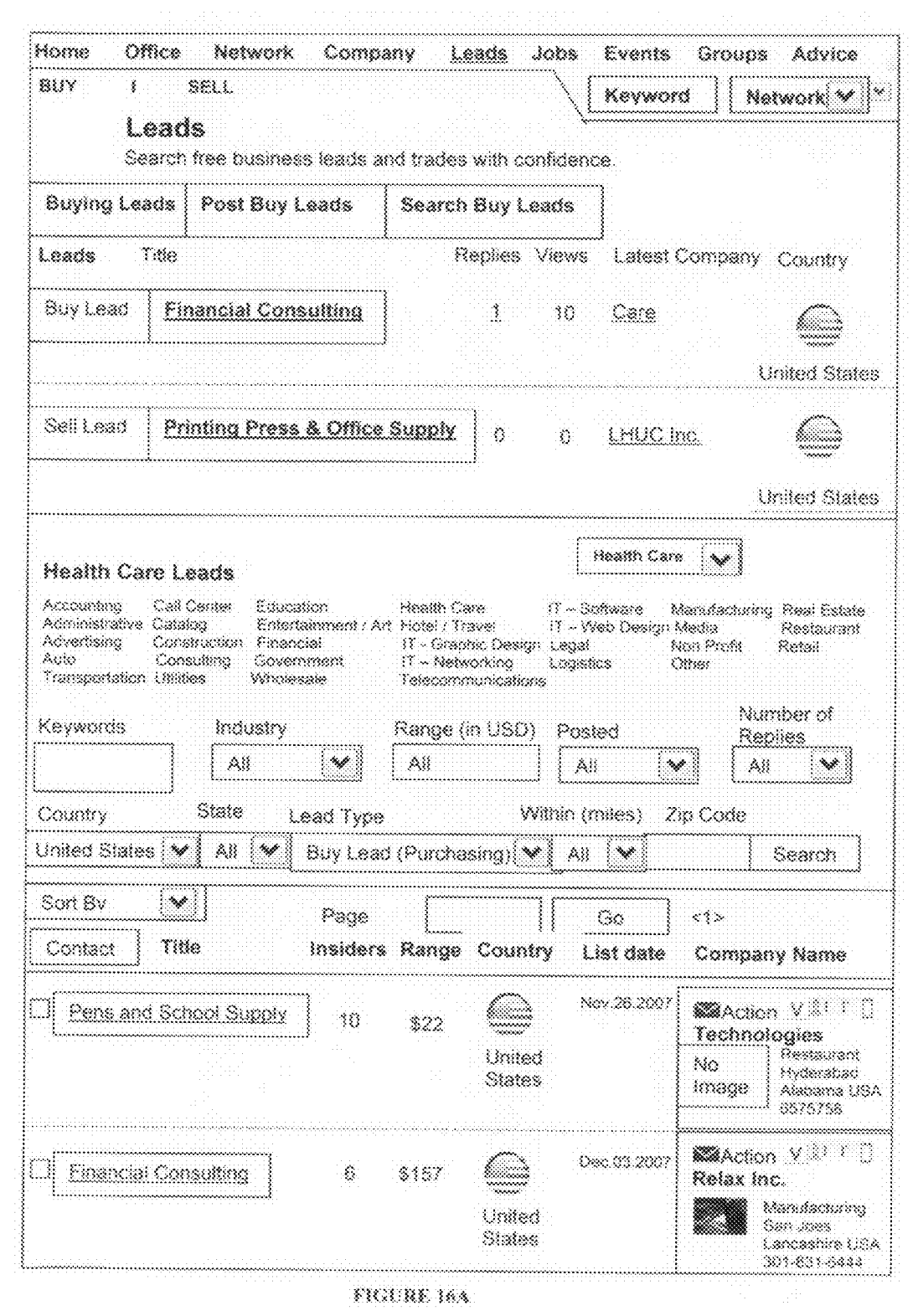
Figure 16B:
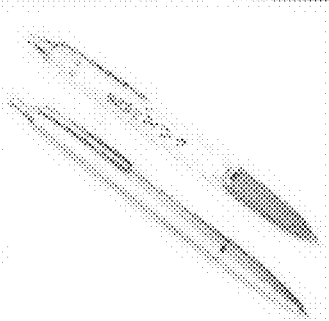
Figure 18:
FIGS. 18A-18B exemplarily illustrate the webpage of the 'events' section in the online networking environment.

FIGS. 16A-16B exemplarily illustrate the webpage of the 'leads' section in the online networking environment. A lead may be information provided by a first user regarding a second user's potential interest in purchasing a product or service. The 'leads' section comprises a "buy leads" section and a "sell leads" section as illustrated in FIG. 16A. The "buy leads" section displays the poster's virtual electronic card and information for users 210 interested in selling a product or service to a company. The "sell leads" section displays the poster's virtual electronic cards and information for users 210 interested in buying a product or service from a company. The "buy leads" section further comprises a "buying leads" webpage, a "post buy leads" webpage, and a "search leads" webpage. The "buying leads" section displays the list of leads posted for buying by the user in the leads webpage along with number of responses the user received for each buy lead posted.

The "post buy leads" section allows the user to post the leads for buying in the webpage of the leads section. The "search leads" section allows the user to search for the leads in the online networking environment. The "sell leads" section comprises a "selling leads" webpage, a "post sell leads" webpage, and a "search leads" webpage. The "selling leads" section displays the list of leads posted for selling by the user in the 'leads' webpage along with number of responses the user received for each sell lead posted. The "post sell leads" section allows the user to post the leads for selling in the webpage of the leads section. The "search leads" section allows the user to search for the leads in the online networking environment. The personal and company electronic card of the user posting a lead or responding to an existing buy or sell lead is displayed next to the posted lead as illustrated in FIG. 16B. Upon clicking on the links for 'replies' and 'views', the user can view the virtual electronic cards of all the users in the category.

Consider an example of a user, Brenda, owning a small company called ABC. Brenda wants to purchase supplies in various geographical locations, nationally and globally. Further, Brenda wants to network with a company based on level of trust and confidence. Therefore, Brenda utilizes the webpage of the 'leads' section to find a desirable sell lead. On the lead webpage Brenda clicks on user's personal electronic card to view the profile of the user and obtain better understanding. After viewing the leads, testimonials, company's information that appears next to the lead posted, and rating which appears on the company electronic card, Brenda responds to selected lead and conducts business with trust and confidence in the online networking environment. Brenda's virtual electronic card appears in the response.

Figure 17A:
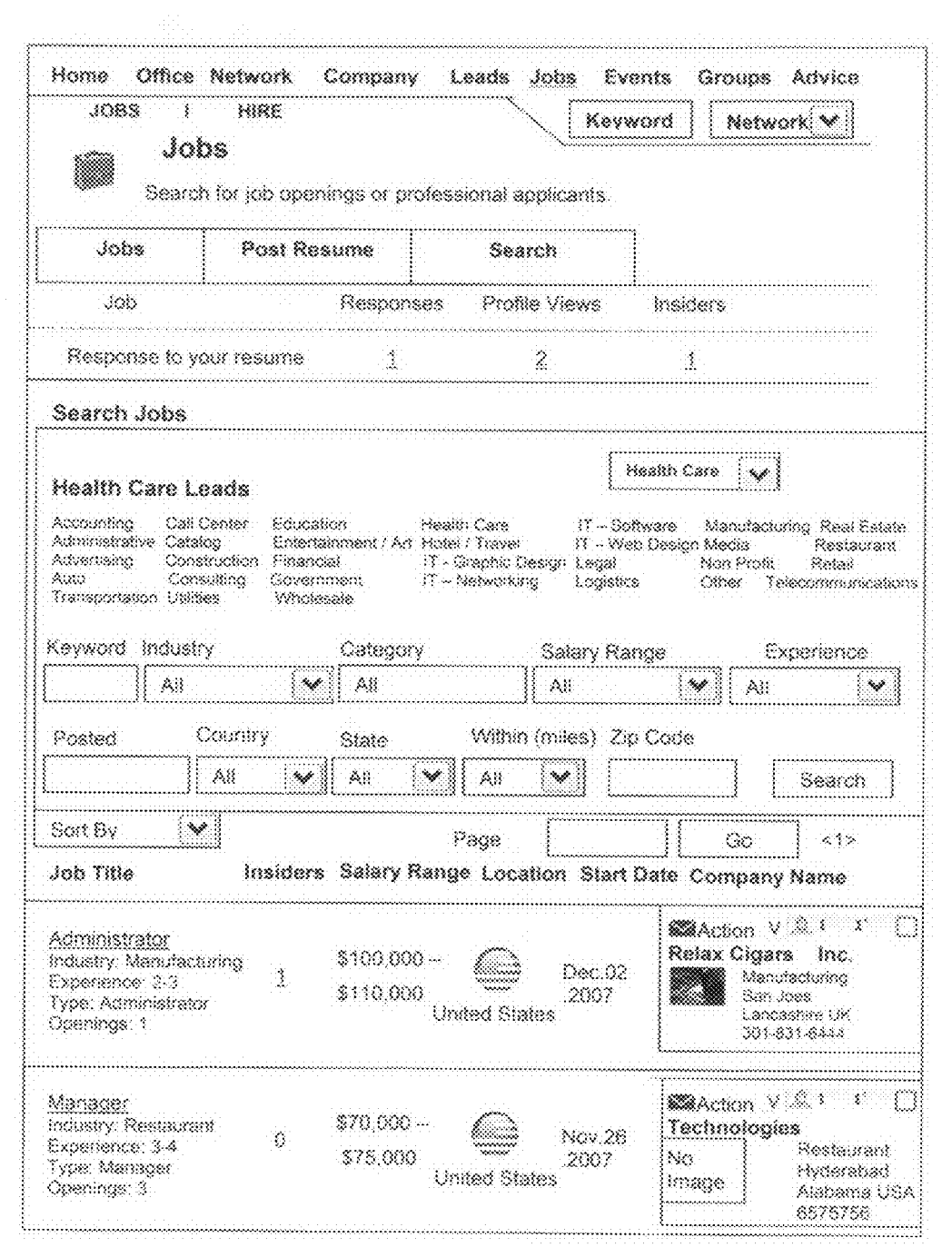
Figure 17B:
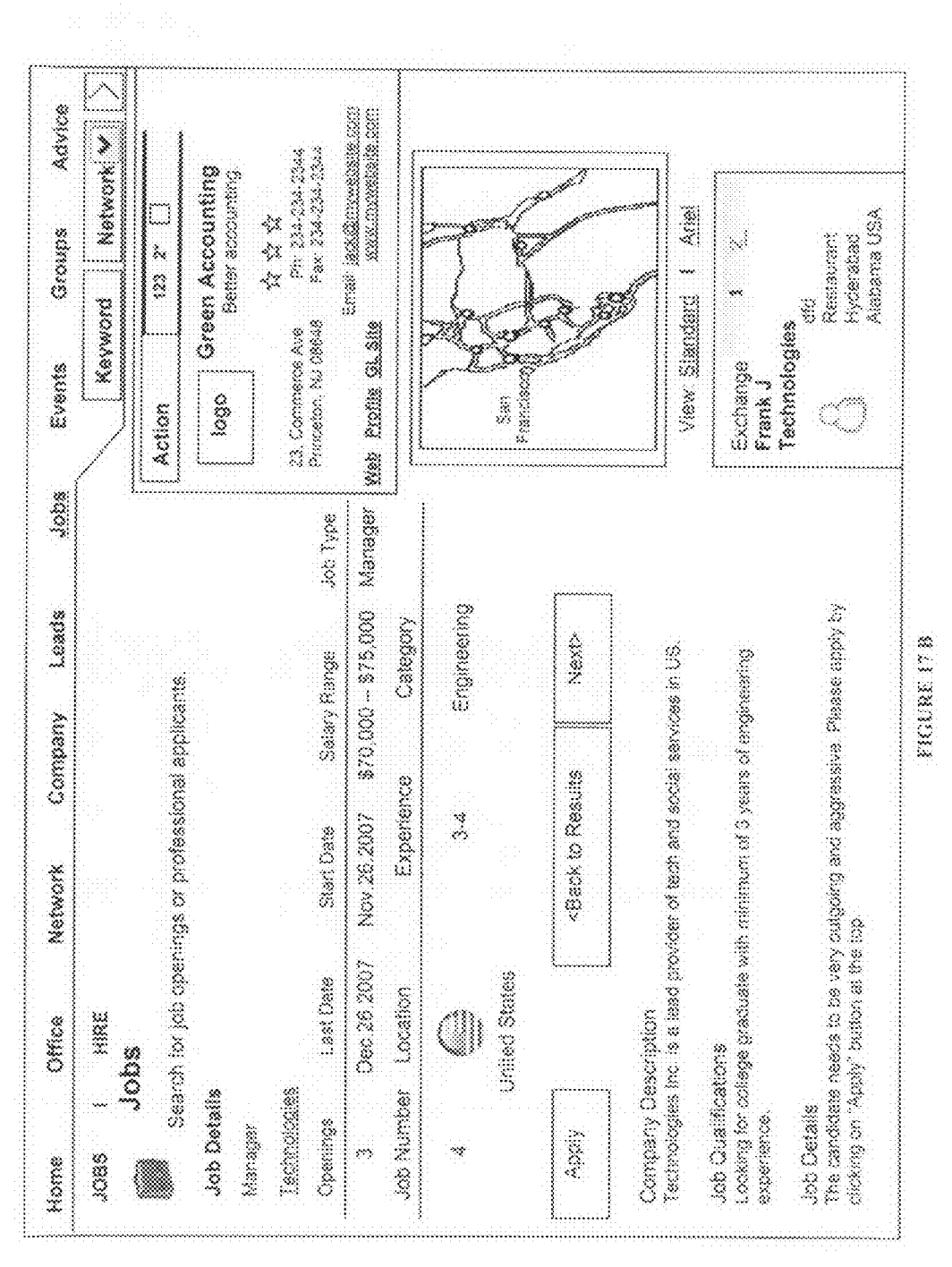

FIGS. 17A-17B exemplarily illustrate the webpage of the 'jobs' section in the online networking environment. The webpage comprises a 'jobs' section and a 'hire' section as illustrated in FIG. 17A. The 'jobs' section may further comprise a 'jobs' webpage, 'post resume' webpage, and 'search' webpage. The jobs the user has applied for and number of members in the company the user has applied to is displayed in the 'jobs' section. The job applicant may post the resume along with personal electronic card in the 'post resume' webpage. A 'search jobs' webpage allows the job applicant to search for the jobs based on one or more of keyword, location, industry, job category, salary etc. Further, the job applicant may view the responses to a submitted resume, the number of views for the submitted resume, and members in the company the user has applied to that are a selected number of degrees away from the user. Upon clicking on the links for 'responses', 'profile views' and 'insiders', the user can view the virtual electronic cards of all the users in the category.

The 'hire' section on the webpage of the jobs section may further comprise a 'hire' webpage, 'post jobs' webpage, and 'search' webpage. For each job opening posted, the number of resumes received, the number of users 210 that viewed the posting, the number of members associated with the company with the job opening that are selected number of degrees away from the user are displayed in the 'hire' webpage of the 'hire' section. The 'Post Jobs' webpage displays an online form allowing the user to post a job opening for others to view. The 'search' webpage allows the user to search for job candidates. The virtual electronic card of the user placing the job opening or responding to a job opening is displayed next to the posted job or response. Further, company electronic card is also displayed along with the job posting as illustrated in FIG. 17B. Upon clicking on the links for 'resumes', 'views' and 'insiders', the user can view the virtual electronic cards of all the users in the category.

Consider an example of a user, Chris, a manager, looking for a candidate with a specific skill set. While using the search feature in the webpage of the 'jobs' section, Chris finds Kate as a potential candidate. By clicking on Kate's virtual electronic card Chris visits Kate's personal profile. On Kate's personal profile, Chris may view business network, leads, events, and groups of Kate to obtain precise understanding of the background of Kate. Chris may invite Kate for an online chat interview and may offer Kate a position in EFG company. Kate will receive the offer in the 'jobs' section and in the inbox on the online networking environment. Kate may then view the company electronic card of the EFG company and see if the company has a good rating. Kate may also click on the company electronic card to view the company profile, the business network, testimonials, and rating in order to get a better understanding of the company. Further, Kate may accept Chris's job offer and may make a decision on whether to join the company or not, based on trust.

Figure 18A:
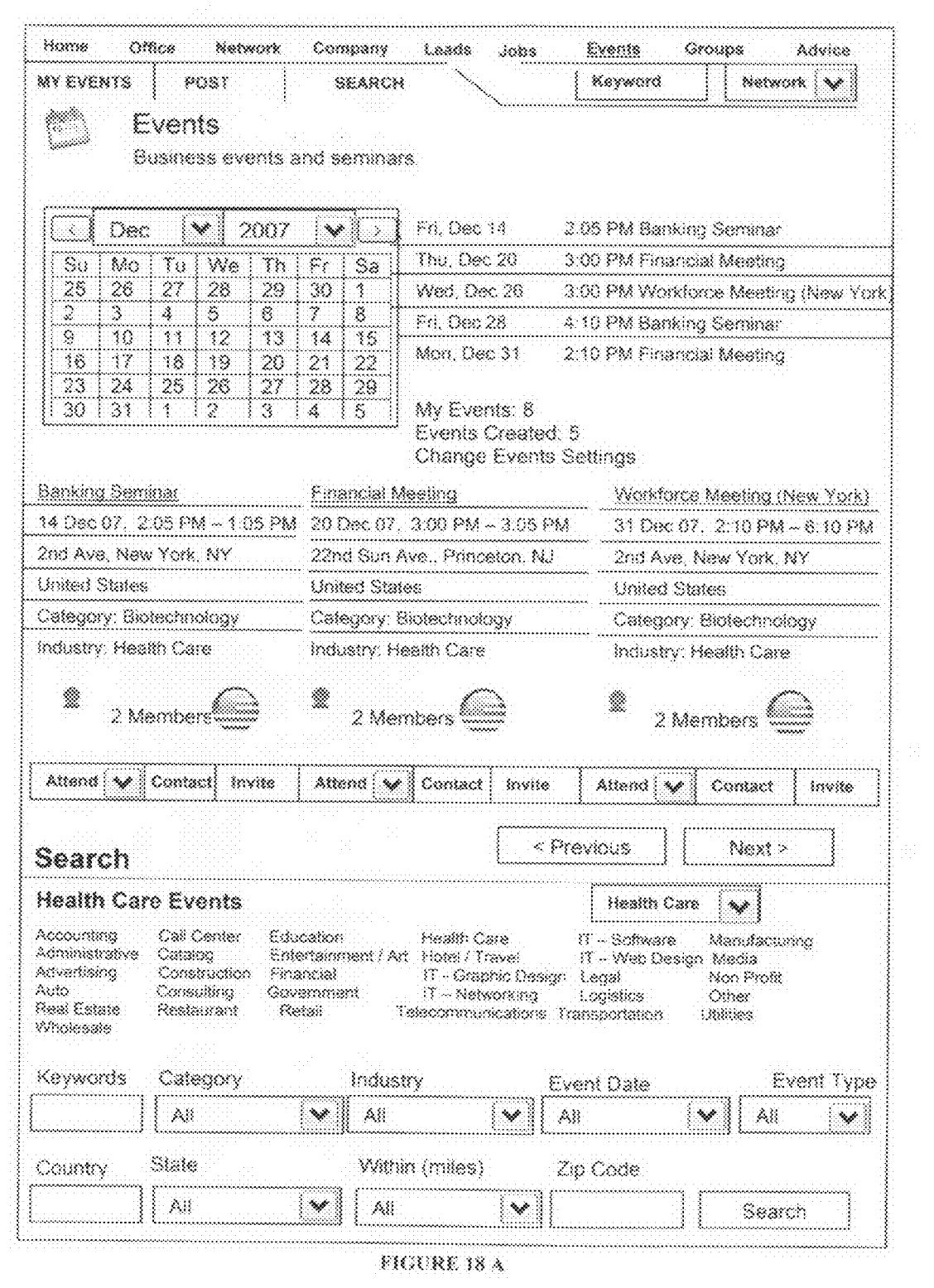

FIGS. 18A-18B exemplarily illustrate the webpage of the 'events' section in the online networking environment. The webpage comprises 'events' webpage, 'post' webpage, and 'search' webpage as illustrated in FIG. 18A. The 'events' webpage displays the events the user has registered for or posted. The 'events' webpage also display how many users viewed each event created by the user and displays the virtual electronic cards of the users who viewed the event. The 'post events' webpage allows the user to create and post an event for other users 210 to view and register. Exemplarily, the event may be a seminar on "customer relationship" for the employees of the company. The user may set the event type on the webpage of the events section as one of public, private, company or branch only, and members in personal contact network only. The 'event detail' webpage displays the event title, description, time, and date along with virtual electronic cards of the creator and virtual electronic cards of the members registered for the event as illustrated in FIG. 18B. The 'search' webpage allows the users 210 to search for the events based on keyword, location, industry, or date. The virtual electronic card of the user posting the event or registering for an event is displayed next to the posted event. Further, user may delete registered events from the events webpage.

Consider an example of a user, Emily, creating an event on the webpage of the 'events' section. The virtual electronic card of Emily is displayed next to the event created by Emily. Consider a second user, David, searches and finds the event created by Emily on the webpage of the 'events' section. Further, David may decide to attend the event based on the description of the event and the people attending the event which may be viewed on the event detail webpage. The virtual electronic cards of the other attendants of the created event also appear in the webpage of the events section. David may select an attend option in the dropdown menu to participate in the event. Therefore, by using the virtual electronic card, David is able to find an appropriate event and register for the event.

Figure 19A:
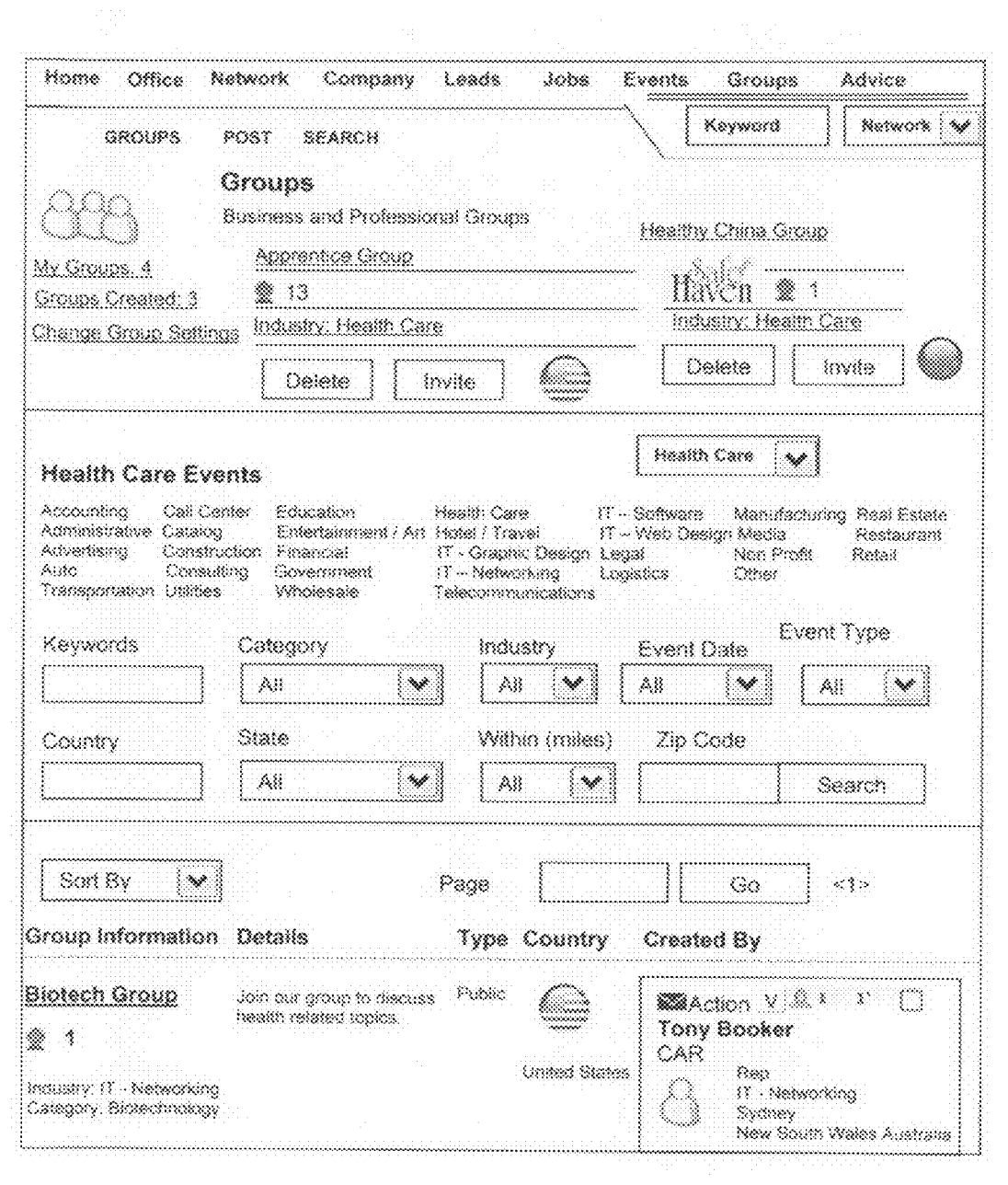

FIGS. 19A-19B exemplarily illustrate the webpage of the 'groups' section in the online networking environment. The 'group' section comprises 'groups' webpage, 'post' webpage, and 'search' webpage as illustrated in FIG. 19A. The groups the user has created or registered for are displayed in the 'groups' section. The 'groups' section also display the number of users 210 who viewed the groups and the virtual electronic cards of the users 210 who viewed the groups. The 'post' webpage allows the user to create a group to discuss a topic and may further allow users 210 to join the group. Exemplarily, the group may be created to discuss a topic such as "increasing productivity in American companies". The created group is displayed on the group webpage along with the virtual electronic card of the member who created the group. The group detail webpage includes group title, description, member's group, image, virtual electronic cards of the creator, and virtual electronic cards of the members registered for the group as illustrated in FIG. 19B. Virtual electronic cards of the group members appear next to their respective comments. The user may invite new members to join the group. The user may make the group 'public', 'private', 'company/branch only', or 'members in network only'. The 'search' webpage of the groups section allows the users 210 to search for a group by keyword, industry, membership size or location. Further, the user may delete registered groups in the webpage of the group section.

Consider an example of a user, Frank living in a remote location and wants to join a group to exchange information and ideas related to engineering. Frank performs a search in the 'search' webpage of the groups section, and after reading group description and viewing virtual electronic cards of the group creator and other members, who have joined the group, identifies a relevant group. Frank can join the group as it is a public group. Frank can view messages posted by other members and the member's virtual electronic cards appear next to their respective posts. Frank can post questions and comments and thus participate in the group discussion. Other members who find Franks comments useful, exchange personal electronic card to include Frank in their personal contact network.

Figure 20B:

FIG. 20A-20B exemplarily illustrates the webpage of the 'advice' section in the online networking environment. The 'advice' section comprises 'advice' webpage, 'post' webpage, and 'search' webpage as illustrated in FIG. 20A. The 'advice' webpage displays the questions the user posted and the advice other users 210 have provided to each of the questions. The 'advice' webpage also display the number of users 210 who viewed the question and the virtual electronic cards of the users 210 who viewed the question. The 'post' webpage allows the users 210 to post a question in the webpage of the advice section in the online networking environment for other users 210 to provide the advice. Further, on 'advice detail' webpage the users 210 may reply to the post or reply to the initial question and the virtual electronic card of the users 210 is displayed next to the respective advice as illustrated in FIG. 20B. The virtual electronic card of the user that created the question also appears on the 'advice detail' webpage along with the question and images. The 'search' webpage allows the users 210 to search for the advice posted by other members, based on a keyword, industry, date etc. The virtual electronic card of the user posting the question or responding to a question is displayed next to the posted question or response. Upon clicking on the links for 'advice' and 'views', the user can view the virtual electronic cards of all the users in the category.

Consider an example of a user, John, seeking advice on financial investment. John performs a keyword search in the 'search' webpage of the advice section and is unable to find answer to a question. Further, John posts the question in the 'post' webpage of the advice section. Mark who is a professional in banking industry views the question posted by John and responds. Mark's virtual electronic card appears along with the response provided by Mark. John views the response along with Mark's virtual electronic card. Further, John offers to exchange virtual electronic cards to include Mark in his personal contact network upon Mark's approval.

Figure 21:
FIG. 21 exemplarily illustrates a chat session used for online meetings in the online networking environment.

FIG. 21 exemplarily illustrates a chat session used for online meetings in the online networking environment. The online chat module 208 displays one or more of virtual electronic cards of the users 210 involved in a chat session, a chat window, a text input section, an online briefcase, and buttons for performing different user actions during the chat session. For example, the user may click the respective buttons of the online chat module 208 to view a company website, a personal profile of the user, or website on the online networking environment. The chat window displays the conversation between the users 210 of the online chat module 208. The text input section allows the user to input the text for the conversation. The online briefcase allows the users 210 to store and exchange one or more of images, text files, audio files, and video files with other users 210 using the online chat module 208. The online chat module 208 is utilized for online meetings, seminars, and interviews in the online networking environment. The option for meeting allows the user to invite one or plurality of users to an online chat meeting at a specified time. Upon approval of the other user, all participating users view a chat window at the agreed time. As the chat window displays the virtual electronic card of the user, the users 210 involved in the chat session can view more information about the other user.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory. Volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include NET, PHP, HTML, Flash, AJAX, C, C++, C#, JAVA, JavaScript etc. The software programs may be stored on or in one or more mediums as an object code. A computer program product comprising computer executable instructions embodied in a computer-readable medium comprises computer parsable codes for the implementation of the processes of various embodiments.

Where databases are described such as the virtual electronic card database 206, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, example, tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. Personal digital assistants (PDA), cell phones and other electronic devices may also be used. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method of online networking based on exchange of virtual electronic cards between a plurality of users, comprising the steps of:
    providing a computer system connected to a communication network;
    providing an online networking environment accessible through a graphical user interface of said computer system;
    accessing said online networking environment using an electronic device, wherein said electronic device allows a user to interact with said graphical user interface to access said online networking environment;
    creating a personal profile by said user for creation of a virtual electronic card in said online networking environment, wherein said personal profile of the user comprises user information and personal electronic card, and wherein said personal electronic cart is created automatically based on said user information;
    creating a company profile of a company by said user for creation of said virtual electronic card, wherein said company profile comprises company information and a company electronic card, wherein said company electronic card is created automatically based on said company information, and wherein said step of creating said company profile comprises:
    searching for an existing company in the online networking environment;
    associating the user with said existing company, wherein the user is an employee of the existing company;
    linking the virtual electronic card of the user with the virtual electronic cards of existing employees of the existing company;
    establishing a personal contact network of the user in the online networking environment, comprising:
    searching for a potential match from a plurality of users based on information in personal electronic cards of said users;
    providing a view of degrees of separation between said personal electronic card of said user initiating the search and said personal electronic cards of said users, wherein said degrees of separation indicates the smallest number of users that the user is away from said potential match, and wherein said users between said user and said potential match comprise one or more common linkers that are already in the personal contact network of the user;
    sending an invitation request to said potential match; and
    exchanging the personal electronic cards between the user and said potential match after accepting said invitation, wherein said step of exchanging further comprises linking the personal electronic card of the user with the personal electronic card of the potential match and vice versa;
    establishing a company contact network of the company of the user by exchanging company electronic cards between the company of the user and a plurality of companies;
    whereby said exchange of said virtual electronic cards enables said online networking between the plurality of users and said plurality of companies.

2. The computer implemented method of claim 1, wherein the virtual electronic cards and associated information of the users are stored on an electronic device.

3. The computer implemented method of claim 1, wherein said company profile includes an organizational chart comprising multiple personal electronic cards of employees of the company in a predefined order.

4. The computer implemented method of claim 1, wherein the virtual electronic cards are searched based on one or more of keywords, companies, location, and title.

5. The computer implemented method of claim 1, wherein said personal electronic card is one of an image and a multimedia card comprising user information.

6. The computer implemented method of claim 1, wherein said company electronic card is one of an image and a multimedia card comprising company information.

7. The computer implemented method of claim 1, wherein the plurality of users view said personal profile by clicking said personal electronic card and said company profile by clicking said company electronic card.

8. The computer implemented method of claim 1, wherein the virtual electronic card of a larger size is displayed by scrolling over a smaller sized virtual electronic card.

9. The computer implemented method of claim 1, wherein the user edits and formats the virtual electronic card by one or more steps of selecting background, formatting text, uploading an image, and editing styles and information of the virtual electronic card.

10. The computer implemented method of claim 1, wherein said personal electronic card includes a list with options for the user to perform the steps of:
   said exchanging of said personal electronic cards with one or more of said users;
   deleting the personal electronic card of one or more of the users from said personal contact network;
   forwarding the personal electronic card of one or more of the users of the personal contact network to one or more users in the personal contact network and one or more companies in said company contact network;
   sending messages to one or more of the users of the personal contact network; and
   inviting one or more of the users of the personal contact network to one or more of online meetings, business network, events, groups, advice section, jobs section, and leads section.

11. The computer implemented method of claim 1, wherein said company electronic card includes a list with options for the user to perform the steps of:
   said exchanging of said company electronic cards with one or more of said companies;
   deleting one or more of the company electronic cards from said company contact network;
   forwarding the company electronic card of one or more of the companies to one or more of the companies in the company contact network and one or more users in said personal contact network;
   sending messages to the companies in the company contact network;
   inviting company representatives of the companies to online meetings; and
   inviting company employees of the company contact network to one of more of events, groups, online meetings, advice section, jobs section, and leads section.

12. The computer implemented method of claim 11, wherein said step of exchanging the company electronic cards comprises automatically sending invitation messages to said company representatives of the companies to approve and join the company contact network.

13. The computer implemented method of claim 1, wherein the user uploads an image and multimedia of a scanned business card, wherein said scanned business card is used as the personal electronic card by the user.

14. The computer implemented method of claim 1, wherein the user sends the virtual electronic card to one or more of existing users and non users of the online networking environment via an electronic mail.

15. The computer implemented method of claim 1, wherein one or more of events, groups, advice section, leads section, jobs section, business network, online meetings, the company profile of the company and the user, the personal profile of the user, and company section appear in the online networking environment.

16. The computer implemented method of claim 15, wherein said events, said groups, said advice section, said leads section, said jobs section, said business network, said online meetings, the company profile of the company and the user, the personal profile of the user, and said company section display one of personal electronic cards and company electronic cards.

17. The computer implemented method of claim 1, wherein the virtual electronic cards in the online networking environment are accessed from one of a web browser, a personal digital assistant, and other electronic devices.

18. A computer implemented system for online networking based on exchange of virtual electronic cards between a plurality of users, comprising: a computer system connected to a communication network, wherein said computer system comprises:
   a memory;
   an online graphical user interface for enabling a user to create a personal profile and a company profile in an online networking environment;
   a linking module stored on the memory for linking said user with one or more of an existing company, employees of said company, and a potential match from said users;
   a virtual electronic card control module for administering processes associated with a virtual electronic card, comprising:
      a virtual electronic card creation engine for creating said virtual electronic card automatically;
      a virtual electronic card management and exchange module stored on the memory for one or more of exchanging a personal electronic card between the user and said plurality of users, deleting said personal electronic card, setting online meetings, forwarding the personal electronic card, inviting the plurality of users, and sending messages in said online networking environment; and
      a virtual electronic card customization tool for editing and formatting information and style of the virtual electronic card by the user;
   a search engine for performing searches in the online networking environment, based on one or more of keywords, companies, location, industry, and title;
   said online graphical user interface for providing a view of degrees of separation between said personal electronic card of said user initiating the search and said personal electronic cards of said users;
   a virtual electronic card based user activity module stored on the memory for managing common linkers and number of said users that are away from said user by one or more of said degrees of separation;
   a virtual electronic card database in communication with said computer system for storing said personal electronic cards, said company electronic cards, and data related to said virtual electronic cards.

19. The computer implemented system of claim 18, wherein said virtual electronic card management and exchange module is further used for one or more of exchanging a company electronic card between a company and a plurality of companies, deleting said company electronic card, setting online meetings, forwarding the company electronic card, inviting the plurality of users, and sending messages in the online networking environment.

20. A computer program product comprising computer executable instructions embodied in a non-transitory computer-readable medium, wherein said computer program product comprises a plurality of computer parsable codes for causing a computer to:
- provide an online networking environment accessible through a graphical user interface of said computer system;
- access said online networking environment using an electronic device that allows a user to interact with said graphical user interface to access said online networking environment;
  - create a personal profile by said user for creation of a virtual electronic card in said online networking environment, wherein said personal profile of the user comprises user information and said personal electronic card, and wherein said personal electronic card is created automatically based on said user information;
  - create a company profile of a company by said user for creation of said virtual electronic card, wherein said company profile comprises company information and said company electronic card, wherein said company electronic card is created automatically based on said company information, and wherein said computer parsable codes further cause said computer to:
- search for an existing company in the online networking environment;
- associate the user with said existing company, wherein the user is an employee of the existing company;
- link the virtual electronic card of the user with the virtual electronic cards of existing employees of the existing company;
- establish a personal contact network of the user in the online networking environment, comprising:
  - search for a potential match from a plurality of users based on information in personal electronic cards of said users;
  - provide a view of degrees of separation between said personal electronic card of said user initiating the search and said personal electronic cards of said users, wherein said degrees of separation indicates the smallest number of users that the user is away from said potential match, and wherein said users between said user and said potential match comprise one or more common linkers that are already in the personal contact network of the user;
- send an invitation request to said potential match; and
- exchange the personal electronic cards between the user and said potential match after accepting said invitation, wherein said step of exchanging further comprises linking the personal electronic card of the user with the personal electronic card of the potential match and vice versa;
- establish a company contact network of the company of the user by exchanging company electronic cards between the company and a plurality of companies; and
- link virtual electronic cards with respective events, groups, advice section, leads section, jobs section, business network, online meetings, company profile of the company and the user, personal profile of the user, and company section in the online networking environment.

* * * * *